US009715432B2

(12) United States Patent
Matas et al.

(10) Patent No.: US 9,715,432 B2
(45) Date of Patent: Jul. 25, 2017

(54) MEMORY FAULT SUPPRESSION VIA RE-EXECUTION AND HARDWARE FSM

(71) Applicant: INTEL CORPORATION, Santa Clara, CA (US)

(72) Inventors: Ramon Matas, Portland, OR (US); Roger Gramunt, Portland, OH (US); Chung-Lun Chan, Hillsboro, OR (US); Benjamin C. Chaffin, Portland, OR (US); Aditya Kesiraju, San Jose, CA (US); Jonathan C. Hall, Hillsboro, OR (US); Jesus Corbal, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 186 days.

(21) Appl. No.: 14/581,859

(22) Filed: Dec. 23, 2014

(65) Prior Publication Data

US 2016/0179632 A1 Jun. 23, 2016

(51) Int. Cl.
*G06F 11/14* (2006.01)
*G06F 9/38* (2006.01)

(52) U.S. Cl.
CPC .............. *G06F 11/141* (2013.01); *G06F 9/38* (2013.01)

(58) Field of Classification Search
CPC ........... G06F 9/30018; G06F 17/30507; G06F 9/30145; G06F 11/0751; G06F 11/10; G11C 7/1006
See application file for complete search history.

(56) References Cited

U.S. PATENT DOCUMENTS

| | | | | | |
|---|---|---|---|---|---|
| 5,040,108 | A | * | 8/1991 | Kanazawa | ............ G06F 11/141 713/375 |
| 5,923,681 | A | * | 7/1999 | Denton | ................. H04J 3/1617 370/905 |
| 6,311,299 | B1 | * | 10/2001 | Bunker | .................... G11C 7/02 714/719 |

(Continued)

OTHER PUBLICATIONS

Solomon, et al., "Micro-Operation Cache: A Power Aware Frontend for Variable Instruction Length ISA" Intel Corporation, ISLEPD'01, Aug. 6-7, 2001, USA.

*Primary Examiner* — Loan L. T. Truong
(74) *Attorney, Agent, or Firm* — Jason H. Vick; Sheridan Ross, PC

(57) ABSTRACT

Exemplary aspects are directed toward resolving fault suppression in hardware, which at the same time does not incur a performance hit. For example, when multiple instructions are executing simultaneously, a mask can specify which elements need not be executed. If the mask is disabled, those elements do not need to be executed. A determination is then made as to whether a fault happens in one of the elements that have been disabled. If there is a fault in one of the elements that has been disabled, a state machine re-fetches the instructions in a special mode. More specifically, the state machine determines if the fault is on a disabled element, and if the fault is on a disabled element, then the state machine specifies that the fault should be ignored. If during the first execution there was no mask, if there is an error present during execution, then the element is re-run with the mask to see if the error is a "real" fault.

16 Claims, 20 Drawing Sheets

(56) References Cited

U.S. PATENT DOCUMENTS

| | | | | |
|---|---|---|---|---|
| 6,976,096 | B1* | 12/2005 | Cherukuri | H04J 3/085 370/229 |
| 7,870,369 | B1* | 1/2011 | Nelson | G06F 9/3808 712/207 |
| 9,396,056 | B2 | 7/2016 | Sperber et al. | |
| 2002/0107975 | A1* | 8/2002 | Patel | H04J 3/0602 709/236 |
| 2005/0229089 | A1* | 10/2005 | Oza | H03M 13/2906 714/801 |
| 2006/0179346 | A1* | 8/2006 | Bishop | G06F 11/1407 714/13 |
| 2007/0283106 | A1* | 12/2007 | Kalogeropulos | G06F 8/4442 711/154 |
| 2009/0327800 | A1* | 12/2009 | Kim | G06F 11/1044 714/5.11 |
| 2010/0131742 | A1* | 5/2010 | Col | G06F 9/3842 712/220 |
| 2010/0269018 | A1* | 10/2010 | Clark | G06F 9/3867 714/763 |
| 2011/0107166 | A1* | 5/2011 | Flautner | G06F 11/1604 714/746 |
| 2012/0254593 | A1* | 10/2012 | San Adrian | G06F 9/30018 712/205 |
| 2014/0149802 | A1* | 5/2014 | Hughes | G06F 11/004 714/47.1 |
| 2014/0189291 | A1* | 7/2014 | Yang | G06F 9/30036 712/7 |
| 2014/0189320 | A1* | 7/2014 | Kuo | G06F 9/3001 712/222 |
| 2015/0261590 | A1* | 9/2015 | Sperber | G06F 11/0721 714/42 |
| 2015/0317338 | A1* | 11/2015 | Radovic | G06F 17/30309 707/695 |

* cited by examiner

| Name | Size in Bits | Comments |
| --- | --- | --- |
| State | 2 | Invalid, Valid, Mask read... |
| LA | 48 | |
| Msize | 7 | |
| Vsize | 1 | (SS/PS→0, SD/PD→1) |
| Broadcast | 1 | |
| Expand | 1 | |
| KSRC | 4 | Logical Mask Source |
| Segment Information | ~ 7 | Violation+Limit/Address Alignment? |
| Breakpoint Partial Match | ~5 | Partial Breakdown Match Information |
| TOTAL | ~75 | |

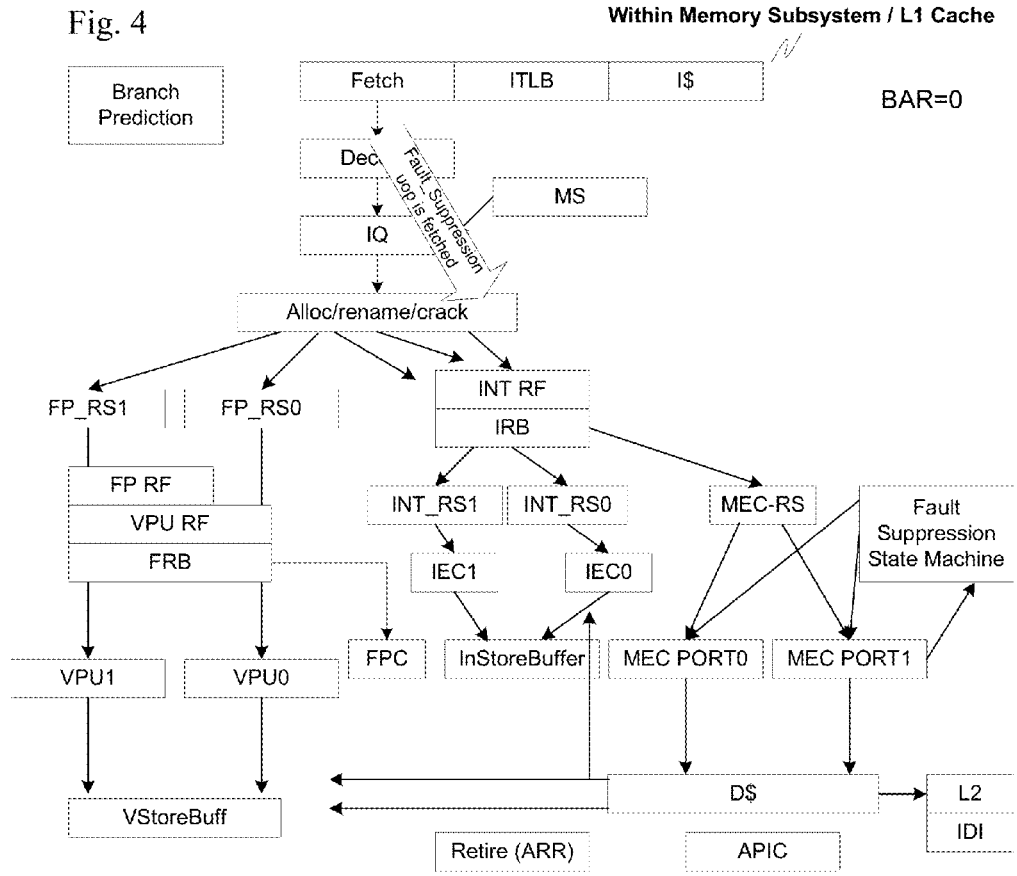

MEC – Memory Execution Cluster. This is the execution unit responsible for memory operations.
ARR – Allocation, Rename, and Retirement cluster.
VFU – vector and floating-point execution unit.
non-WB memory type – non-writeback memory type includes uncacheable, write-through, write-protect, and write-combined
BAR – block at retirement. It a bit to indicate that the instruction can only be dispatched when it is at retire (meaning all older instructions have retired).
ITLB    - instruction table lookaside buffer
I$      - L1 instruction cache
MS      - microcode sequencer
IQ      - instruction queue
INT RF  - integer register file
IRB     - integer rename buffer
INT_RS  - integer reservation station
FP_RS   - VFU reservation station
MEC_RS  – Memory Execution cluster's reservation station
FP_RF   – floating point register file
VPU_RF  – vector register file
FRB     - floating-point and vector renaming buffer
FPC     - floating-point execution unit
VPU     - vector processing unit
IEC     - integer execution cluster
D$      - L1 data cache
L2      - L2 cache
IntStoreBuff – integer store buffer
VstoreBuff – vector store buffer

MEMORY FAULT SUPPRESSION VIA RE-EXECUTION AND HARDWARE FSM

TECHNICAL FIELD

An exemplary aspect relates to processors. In particular, exemplary embodiments relate to processors and memory as well as methods and techniques for memory fault suppression.

BACKGROUND

Processors are commonly operable to perform instructions to access memory and perform computations. For example, processors may execute load instructions to load or read data for memory and/or store instructions to store or write data to memory, to facilitate various computational processes. Additionally, processors execute one or more applications to, for example, solve problems, analyse data, perform computations, and the like.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 is a table outlining values within the fault suppression finite state machine;

FIG. 4 illustrates an exemplary operational flow of memory fault suppression;

DESCRIPTION OF EMBODIMENTS

Figure 1:
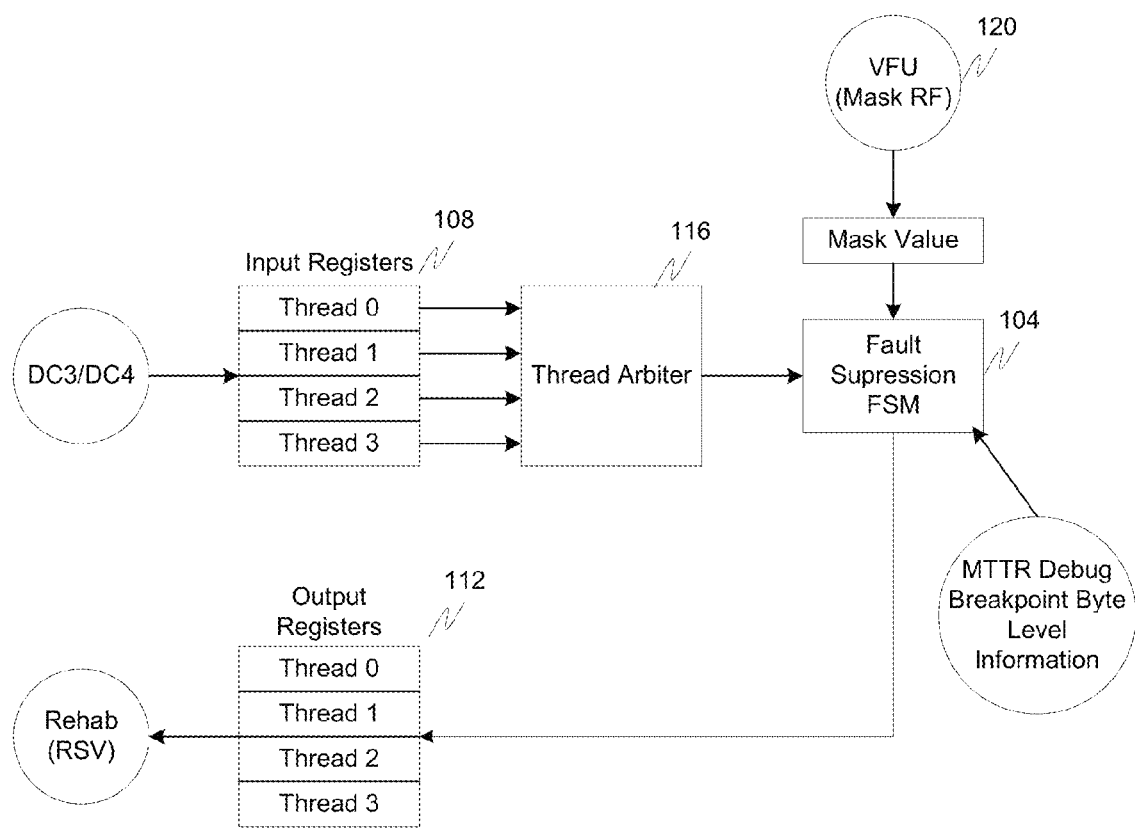
FIG. 1 illustrates and exemplary embodiment of the fault suppression finite state machine and associated components.

A CPU cache is a cache used by a CPU (Central Processing Unit) of a computer that has one advantage of reducing the amount of time it takes to access data. Typically, caches are smaller, faster, and physically located closer than a main computer's memory with these caches storing copies of data of frequently used in main memory locations. Most CPU's have different independent caches, including instruction and data caches, where the data caches are usually organized as a hierarchy of one or more cache levels, such as the L1 cache, L2 cache, L3 cache, and the like. Pipeline CPUs access memory from multiple points in the pipeline including instruction fetch, virtual-to-physical address translation, and data fetch. One typical design is to use different physical caches for each of these, so that no one physical resource is required to service two or more points in the pipeline. Thus, the pipeline naturally ends up with at least three separate caches, those being instruction caches, translation lookaside buffer caches, and data caches, each of these caches being intended for a specific use.

A micro-operation cache, also known as a uop (or instruction) cache, is a specialized cache that stores micro operations of decoded instructions, as received from an instruction decoder or from an instruction cache. When instruction needs to be decoded, the uop cache can be checked for its decoded form which is re-used if cached and, if not available, the instruction is decoded and then cached. Additional operational details regarding the micro-operation cache can be found in the article by Baruch Solomon, et al., entitled "Micro-Operation Cache: A Power Aware Front End for Variable Instruction Length ISA." Intel Corporation, ISLEPD'01, Aug. 6-7, 2001, USA.

An instruction set, or instruction set architecture, is the part of the computer architecture related to programming including the native data types, instructions, registers, addressing modes, memory architecture, interrupt and exception handling, and external I/O. An instruction set architecture includes a specification of the set of op-codes (machine language) and the native commands implemented by a particular processor (see Wikipedia).

Many different types of instruction sets are currently available, with some of these instruction sets being vectorized instruction sets for instructions that run in parallel. A sub-category of the vectorized instruction sets are instructions sets that have different numbers of bits, with one exemplary instruction set being a 512 bit vectorized instruction set.

Processor operation and memory accesses can be optimized through the use of masks. Masked vector memory operations are defined such that if an element does not have a mask bit set, then the memory access should not happen for the bytes that are masked, when looked at from the point of view of software. During implementation, these masked bytes can still be accessed, fetched, and potentially dropped, however if the access to these bytes is triggering any fault condition, a fault should not be raised/identified.

Many architectures that implement such a feature (often referred to as fault suppression) do not have a masked value available at memory operation execution time. Actually, even if the architectures did have a masked value available at memory operation execution time, checking the faulting conditions individually may be too costly or slow from a processor burden standpoint.

For this reason, performance optimal implementation may speculate no fault, and accesses all bytes for all of the accesses. If everything goes well, and there are no faults, which is typical in most situations, the processor will continue with its fast operation. However, if any fault or strange condition exists, then most processors will go to a slow flow that will make an attempt to precisely report faults.

One implementation relies on a slow ucode flow which will access a mask value and perform accesses on an element-by-element basis. However, this approach has at least one complication with processor cores which cannot re-fetch instruction. The ucode solution requires executing each element of the instruction individually. It may not perform as well as a hardware solution since it places more pressure on the CPU bandwidth and has larger execution overhead.

One exemplary aspect disclosed herein solves at least this problem by completely resolving the fault suppression in hardware, with minimal ucode assistance.

Exemplary aspects are directed toward resolving fault suppression in hardware, which, at the same time, does not incur a performance hit. At a high level, and, for example, when multiple instructions are executing simultaneously, a mask can specify which elements need not be executed. If the mask is disabled, this means that those elements do not need to be executed. A determination is then made as to whether a fault happens in one of the elements that have been disabled. If there is a fault in one of the elements that has been disabled, a state machine re-fetches the instructions in a special mode. More specifically, the state machine determines if the fault is on a disabled element, and if the fault is on a disabled element, then the state machine specifies that the fault should be ignored. If during the first execution there was no mask, if there is an error present during execution, then the element is re-run with the mask to see if the error is a "real" fault.

More specifically, if a memory operation encounters an error, a request will be initiated using ucode for fault suppression. The ucode will set the memory cluster in a safe mode, and re-fetch/re-start the instruction that failed. The memory cluster will then execute the one memory operation in safe mode, blocking the dispatch of younger instructions until the current one is completed. When in the safe mode, if the instruction being re-executed requires fault suppression, then the system can allocate a dedicated hardware resource to it, and slowly fetch the mask value and make sure that it is executing, reporting only exceptions in the non-masked bytes.

One exemplary advantage of the techniques disclosed herein is that it allows a tremendous reduction in complexity of the fault suppression flow in architectures which may not guarantee fetching the same memory bytes from ucode after an assist (i.e., without instruction victim cache). Instead of a complex recording and hand-shake protocol with all of the clusters of the core, an exemplary embodiment requires a minimum ucode flow and a single cluster (memory execution) to do all the work.

The exemplary techniques discussed herein include five different phases:
1. Potential fault detection and ucode assist
2. Re-fetch and safe mode
3. Fault Suppression Finite State Machine (FSM) (Fault Suppression Finite State Machine (FSFSM)) allocation
4. Suppress bits generation
5. Final re-execution.

Figure 3:
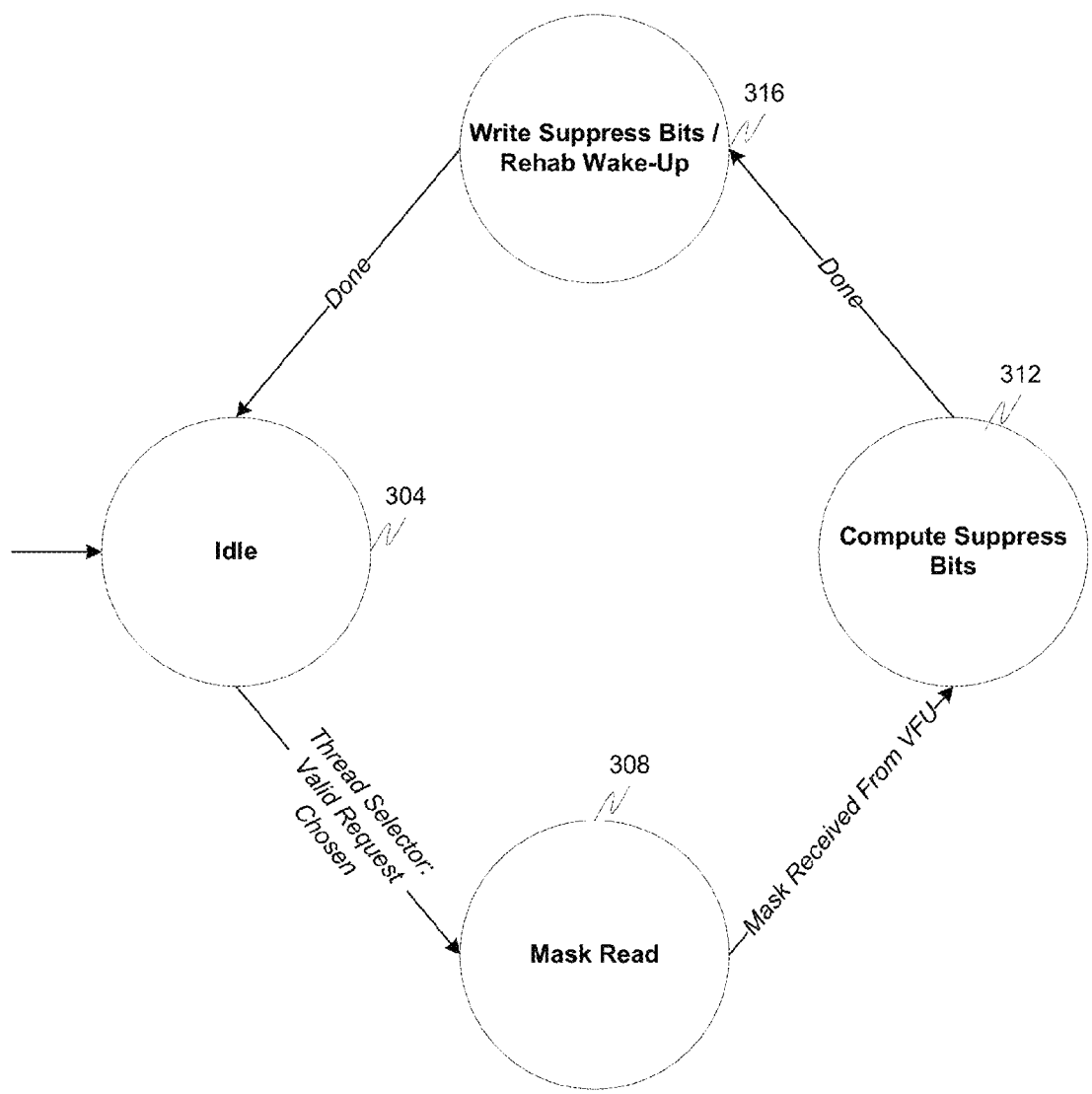
FIG. 3 are exemplary states within the finite state machine.

These fault suppression techniques will be discussed in relation to FIG. 1, which illustrates the fault suppression finite state machine and associated components, with FIG. 2 illustrating examples of some of the types of information that can be stored in the FSFSM input registers, FIG. 3 showing the different states and transitions there between of the FSFSM and FIGS. 4-12 illustrating in greater detail the various steps within each of the above-identified five phases within and exemplary hardware environment.

More specifically, for the first phase of fault detection and ucode assist, for every single instruction, a memory execution cluster will receive a bit from a front end indicating if it is a fault suppression candidate. The instruction flow through the memory execution cluster (MEC) pipe comprises:
  The MEC reservation station dispatches memory instructions into the memory execution pipeline, along with the fault suppression bit to indicate if the instruction is a fault suppression candidate.
  The MEC tries to execute normally, and completes the operation if no fault. However, if a fault occurs, a fault suppression assist event is initiated.
  The allocation, rename and retirement cluster will invoke an AD/Fault Suppression assist, where there will be minimal flow, which is exactly the same as a current AD assist and put the current thread in safe mode and refetch and re-execute the instruction.

There may be no guarantee to re-fetch the exact same instruction, or even an instruction with a fault suppression bit set. However, the MEC, in one exemplary embodiment, can optionally guarantee that for the next MEC instruction executed for this particular thread, the fault suppression assist will not be asserted, but rather the system will try to complete execution of the instruction.

In accordance with one exemplary embodiment, the safe mode can be implemented as a one-shot sticky bit called "block at retirement" (BAR), and can be internally reset as soon the the first instruction (or uop) for the thread in question has been completed. This BAR mode can also be described as placing the processor in a "safe mode."

In the re-fetch and safe mode, this second step starts with the FEC re-fetching the instruction and generating again the fault suppression bit as before. The MEC is now in a safe mode for the thread will remain in the state until the first memory instruction is completed for the thread. In safe mode when the BAR bit is set, the MEC reservation station will dispatch an instruction when at retirement.

For the fault suppression FSM (FSFSM) allocation, and in the safe mode, a behavior of the instruction with the fault suppression bits set will change. Moreover, while being scheduled from reservation station, instead of the normal execution flow, the instruction will:
  Write request information into the FSFSM input registers:
  The FSFSM will have resources available per thread, so no flow control will be required.
  The representation of the FSFSM input registers and the information held and written into the registers can be found in FIGS. 1 and 2.
  If the operation was a split, the system can optionally cancel the split.
  The instruction will be put to sleep after the control is passed to FSFSM (or after the FSFSM is triggered). FSFSM will wake up the sleeping instruction and allow the instruction to be re-dispatched into the MEC pipeline after the fault calculation is complete.

As shown in FIG. 1, the FSFSM 104 is associated with one or more input registers 108 (for an instruction to allocate an entry in the mask fault suppression register), one or more output registers 112, a thread arbiter 116, a vector and floating point execution unit 120, with the exemplary values of the information in the input registers illustrated in FIG. 2, organized by name, size and bits, and any special comments related to the information held in the registers.

In FIG. 2, the various values specify:
LA: linear address (also known as virtual address)
Msize: total size of the memory access
Vsize: vector size
Expand: expand type of vector instruction
Broadcast: broadcast type of vector instruction
Segment Information: or "Fault information"
Breakpoint Partial match: this field can be grouped with "fault information"

For suppress bits generation, the next action is also taken by the FSFSM. At first, there can be some level of thread arbitration (LRU based between requesting threads, i.e., threads with valid non-consumed values in the input registers). Once one thread has been picked, the FSM 104 can start a flow to obtain the value of the logical mask source from the VFU mask register 120. For this purpose, the system includes a new read port in the VFU mask RF, and a new 16 bit VFU-MEC bus. However, in general, any bus capable of accommodating all the mask bits in an instruction will work. For example, 16 bits in an architecture that supports 16 vector elements. Once the mask has been obtained, the FSFSM can combine all information (mask value+input registers) to generate 4 distinct bits.

1. Suppress high (used also in the case of non-split to suppress full access)
   For this value, a determination is made whether the mask is all zeros for a non-split. A further determination is made as to whether the mask is all zeros for the split high portion.
2. Suppress low
   Is the mask all zeros for the split low portion?
3. Generate segment fault
   Does the system have a segment violation? If so, use the violation computed at the first pass+check if the system is touching any byte after the limit.
4. Debug break point hit
   A determination is made as to whether the system needs to generate a break point event for the access. If so, the system uses partial information plus generates a byte level hit based on the mask.

These bits will be written into the threaded FSFSM output threaded registers 112 (which could reside in rehab) and the instruction in rehab for this thread that started the flow will be woken up for scheduling and re-execution.

As shown in FIG. 3, the different states and transitions within the FSFSM are shown. In particular, the states include an idle state 304, a mask read state 308, a compute suppress bits state 312, and a write suppress bits/rehab wake-up state 316. Transition from the idle state 304 to the mask read state 308 occurs when there is a valid request in the thread selector. Transition from the mask read state 308 to the compute suppress bits state 312 occurs when the mask is received from the VFU. Upon completion of computing the suppress bits state 312, the state machine transitions to step 316 where the suppressed bits are written, and rehab is woken up, with control continuing back to the idle state 304.

For final re-execution, the instruction will re-schedule from rehab and will read the contents of the FSFSM output registers (which can optionally be simplified to get rehab to always look at the FSFSM output registers when scheduling fault-suppression instructions in safe mode). If the output register indicates that the portion of the access should not fault, in one embodiment it can be achieved by setting the instruction size to 0. Also, a segment violation or breakpoint can be set to all portions of the instruction.

Now, if faults are raised in the BAR mode, the MEC will report them normally to the allocation, re-name and retirement cluster even if the fault suppression bit is set. Of course, if the size has been previously set to zero, the instruction cannot produce any fault.

One exemplary advantage of this technique is that it results in huge complexity reduction of fault suppression features for vector instructions with masks and precise exceptions.

Figure 5:
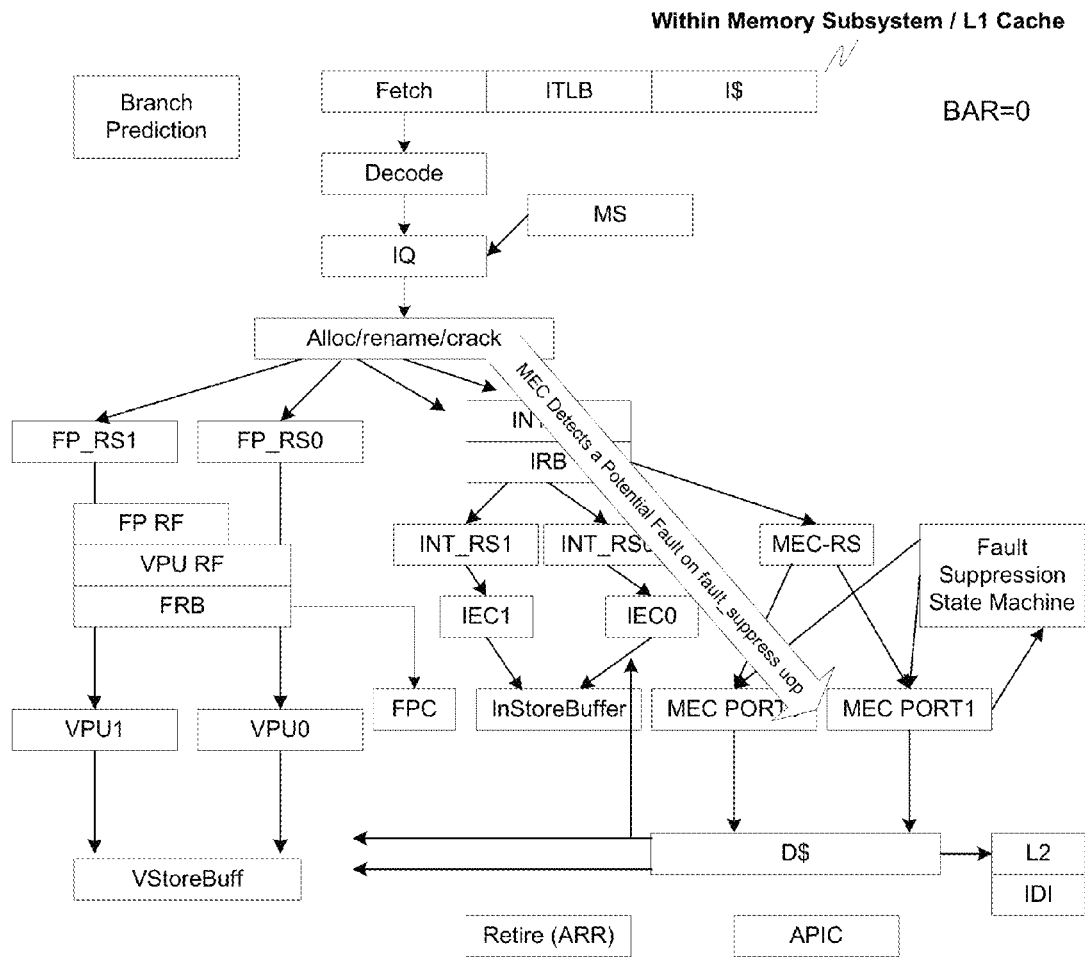
FIG. 5 illustrates an exemplary operational flow of memory fault suppression.
Figure 6:
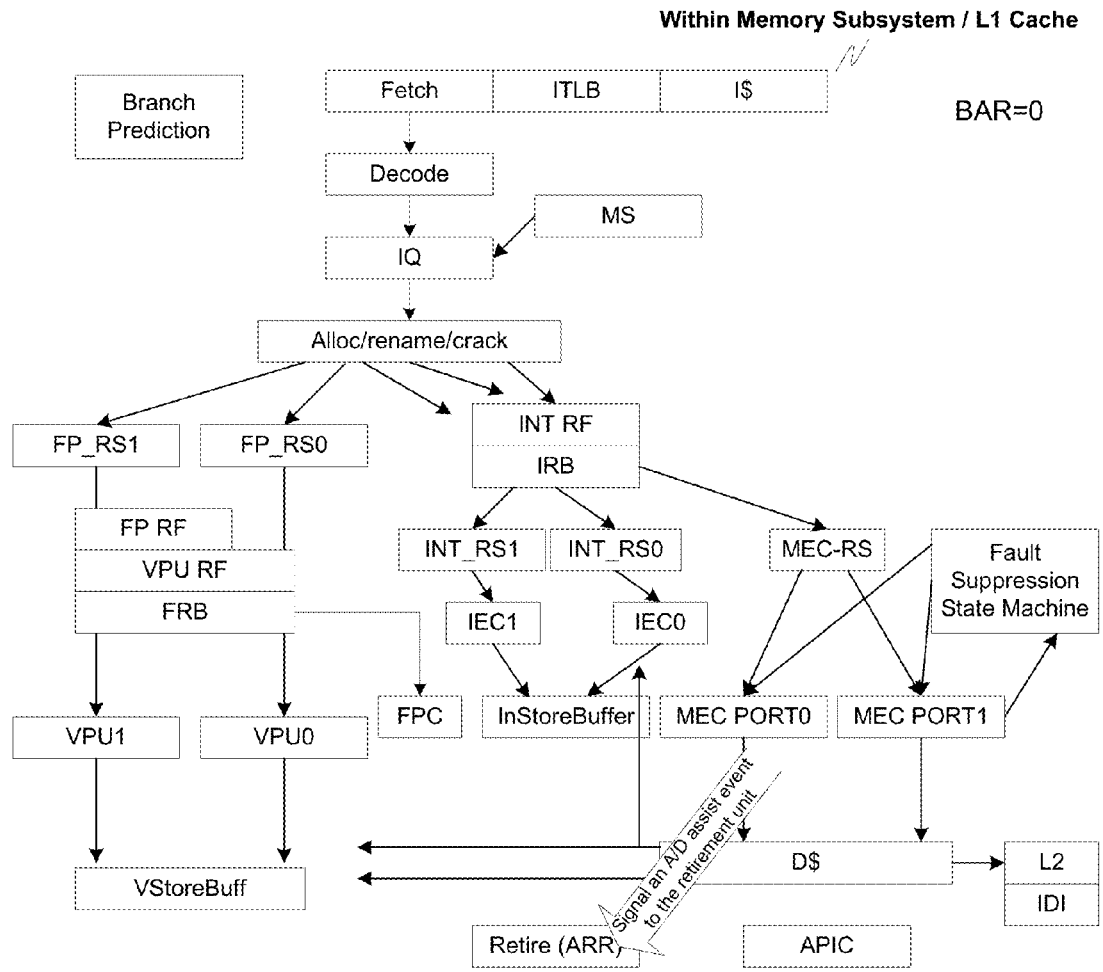
FIG. 6 illustrates an exemplary operational flow of memory fault suppression.

FIGS. 4-12 illustrate an exemplary underlying architecture and flow for one embodiment of how the fault suppression techniques operate. As illustrated in FIG. 4, there are a number of components within a memory subsystem, such as within the L1 cache, which have been overlaid by control flow arrows showing the various steps and operations performed within the detailed components. Within these figures, the following acronyms have been used:

MEC—Memory Execution Cluster. This is the execution unit responsible for memory operations.
ARR—Allocation, Rename, and Retirement cluster.
VFU—vector and floating-point execution unit.
non-WB memory type—non-writeback memory type includes uncacheable, write-through, write-protect, and write-combined
BAR—block at retirement. It a bit to indicate that the instruction can only be dispatched when it is at retire (meaning all older instructions have retired).
ITLB—instruction table lookaside buffer
I$—L1 instruction cache
MS—microcode sequencer
IQ—instruction queue
INT RF—integer register file
IRB—integer rename buffer
INT_RS—integer reservation station
FP_RS—VFU reservation station
MEC_RS—Memory Execution cluster's reservation station
FP_RF—floating point register file
VPU_RF—vector register file
FRB—floating-point and vector renaming buffer
FPC—floating-point execution unit
VPU—vector processing unit
IEC—integer execution cluster
D$—L1 data cache
L2—L2 cache
IntStoreBuff—integer store buffer
VstoreBuff—vector store buffer At a high level, and during operation, fault suppression in accordance with the techniques disclosed herein occurs as follows:

The MEC gets an instruction from the ARR with the instruction having the fault_suppressed attributes set. Described another way, the front end of the processor can decode the instruction and stage along an indication to specify whether it is a fault suppression candidate. The ARR will also send the logical mask source ID of the instruction to the MEC. Next, and as shown in FIG. 5, the MEC executes this instruction. If a fault is found, or if the instruction tries to access non-write back memory, then the MEC, will, in FIG. 6, signal an assist to the ARR. Otherwise, the instruction will complete normally and the process will end.

Figure 7:
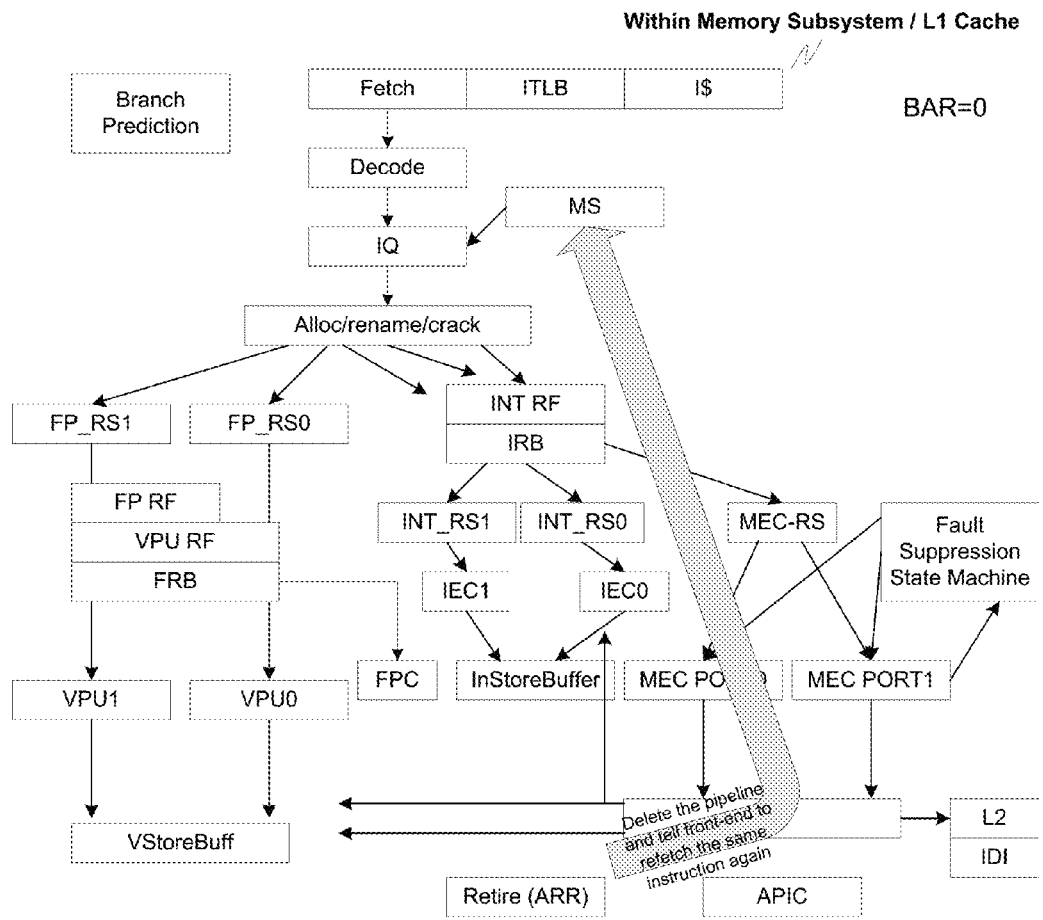
FIG. 7 illustrates an exemplary operational flow of memory fault suppression.
Figure 8:
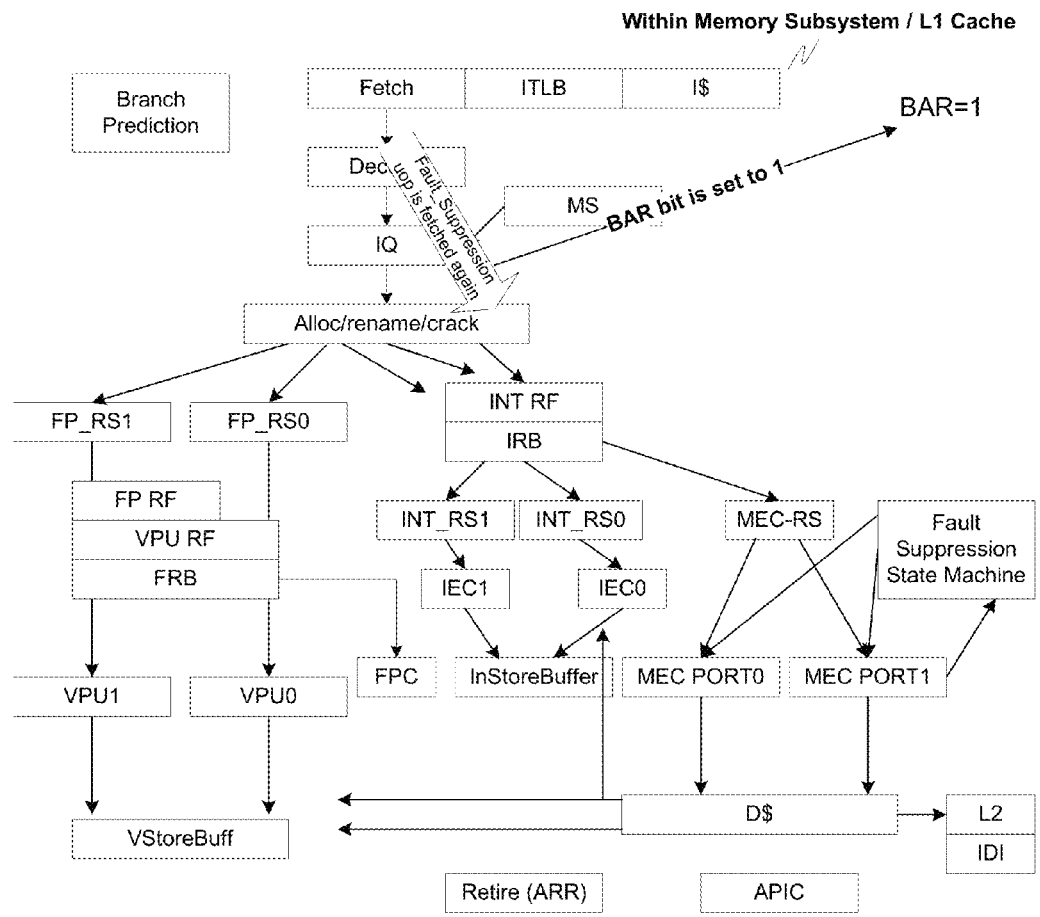
FIG. 8 illustrates an exemplary operational flow of memory fault suppression.

After the signaling of an assist to the ARR, the ARR will flush the MEC pipeline and invoke the ucode to handle the assist. As seen in FIGS. 7 and 8, the ucode places the machine/processor in safe mode by setting the BAR bit of the corresponding thread, which in this case is set to 1. As shown in FIG. 8, the MEC is now in BAR mode. The FEC will re-fetch the instruction and send it to the ARR/MEC as shown in FIG. 9.

Figure 9:
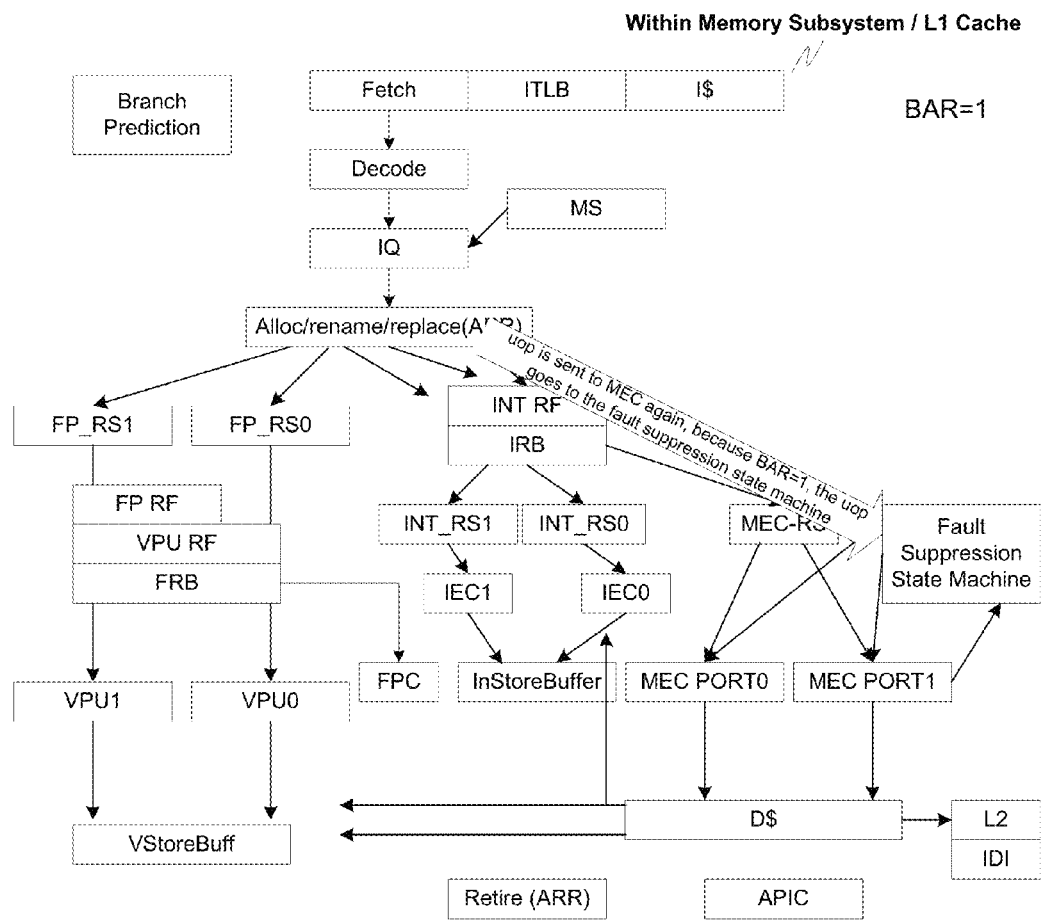
FIG. 9 illustrates an exemplary operational flow of memory fault suppression.

In FIG. 9, where the MEC is in BAR mode as indicated by the BAR=1 designation in FIG. 9, the MEC will load the instruction into the fault suppression table, such as the one illustrated in FIG. 2. At the same time, the instruction is rejected to rehab and put to sleep.

Figure 10:
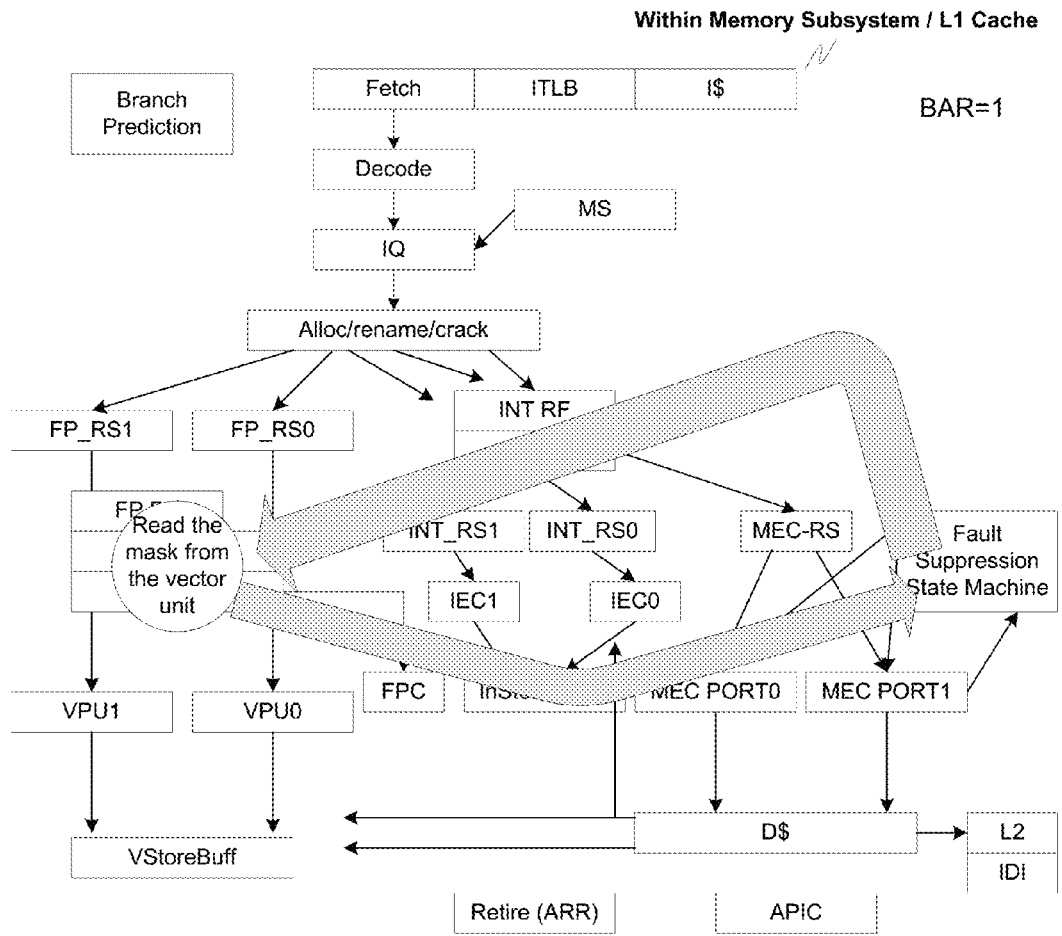
FIG. 10 illustrates an exemplary operational flow of memory fault suppression.
Figure 11:
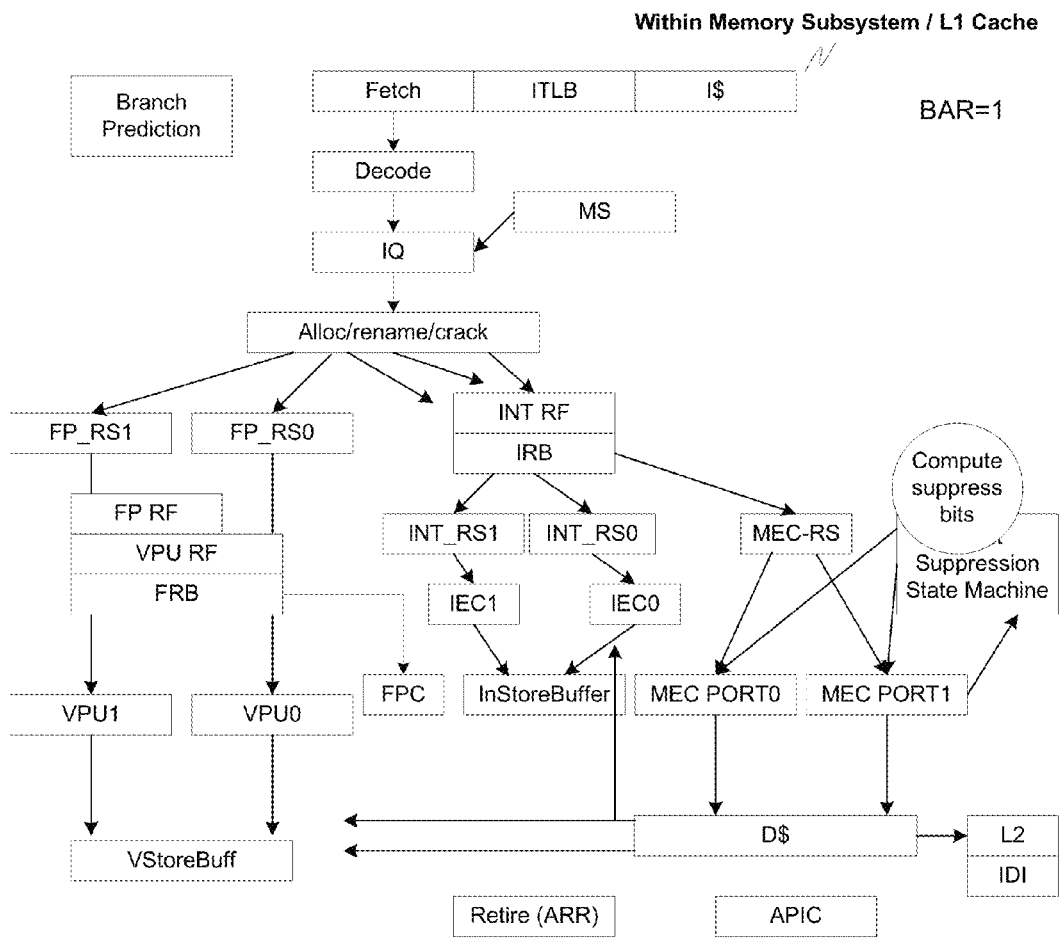
FIG. 11 illustrates an exemplary operational flow of memory fault suppression.
Figure 12:
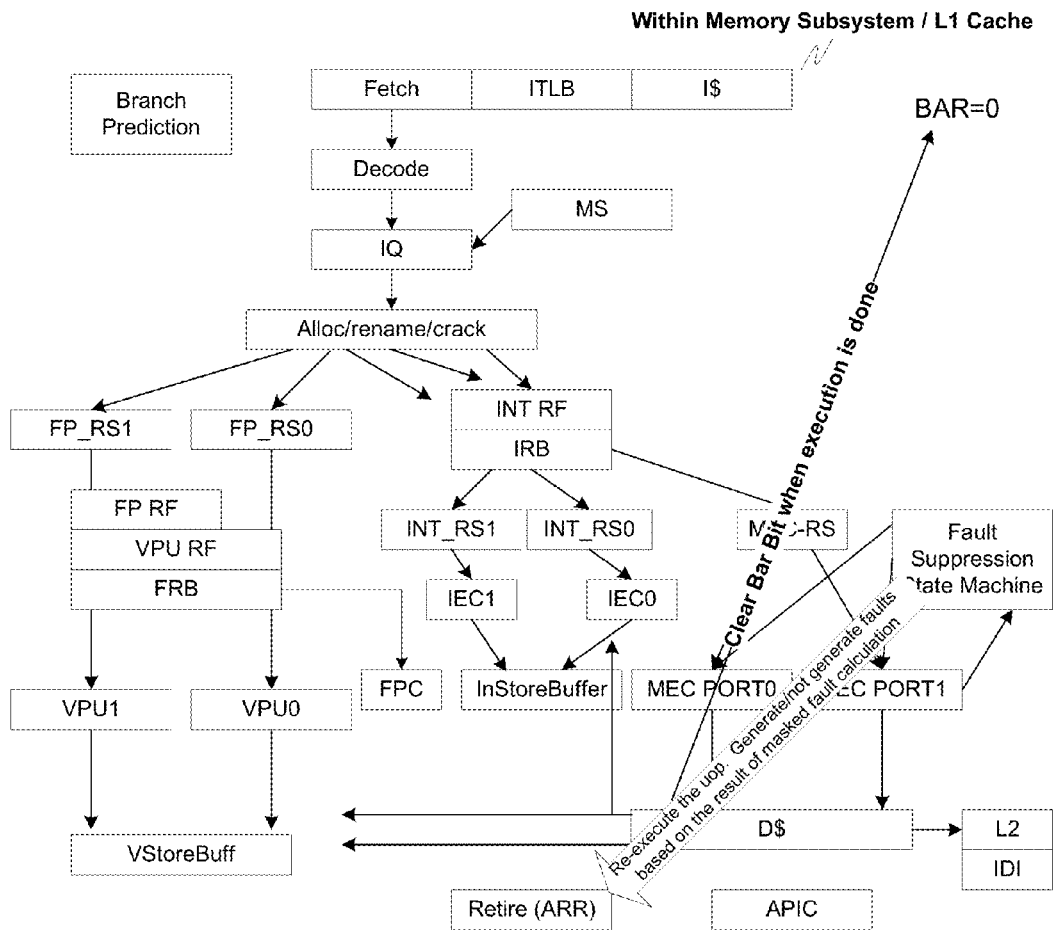
FIG. 12 illustrates an exemplary operational flow of memory fault suppression.

The fault suppression table will operate as follows:

As shown in FIG. 10, the fault suppression table will read the mask from the VFU. Next, by extracting information from the instruction, the fault suppression FSM will determine how many elements are enabled and the size of each element. With these two pieces of information, the fault suppression table will determine how many bytes of memory are being accessed. If access is a split, the fault suppression table will determine how many bytes are in each of the split. If no bytes are being accessed in one or both halves of the split, then the fault suppression table will set the size of that split half to zero. If access is not a split, then the fault suppression table will set the size to zero if no bytes are being accessed at all. Additionally, the fault suppression table will wake up the sleeping rehab entry after setting the size. Next, the instruction will re-issue from rehab. If the size is zero, then the zero size instructions don't report any faults or don't allocate resources to make external requests, with these exemplary steps being illustrated in FIGS. 11 and 12. Then, the MEC will take itself out of BAR mode, by setting the BAR=0 as shown in FIG. 12, after executing the one instruction.

As an aside, split as used herein means the memory access span across a cache line boundary and rehab is a structure responsible for re-dispatching instructions that don't complete previously back to the memory execution pipeline.

Figure 13:
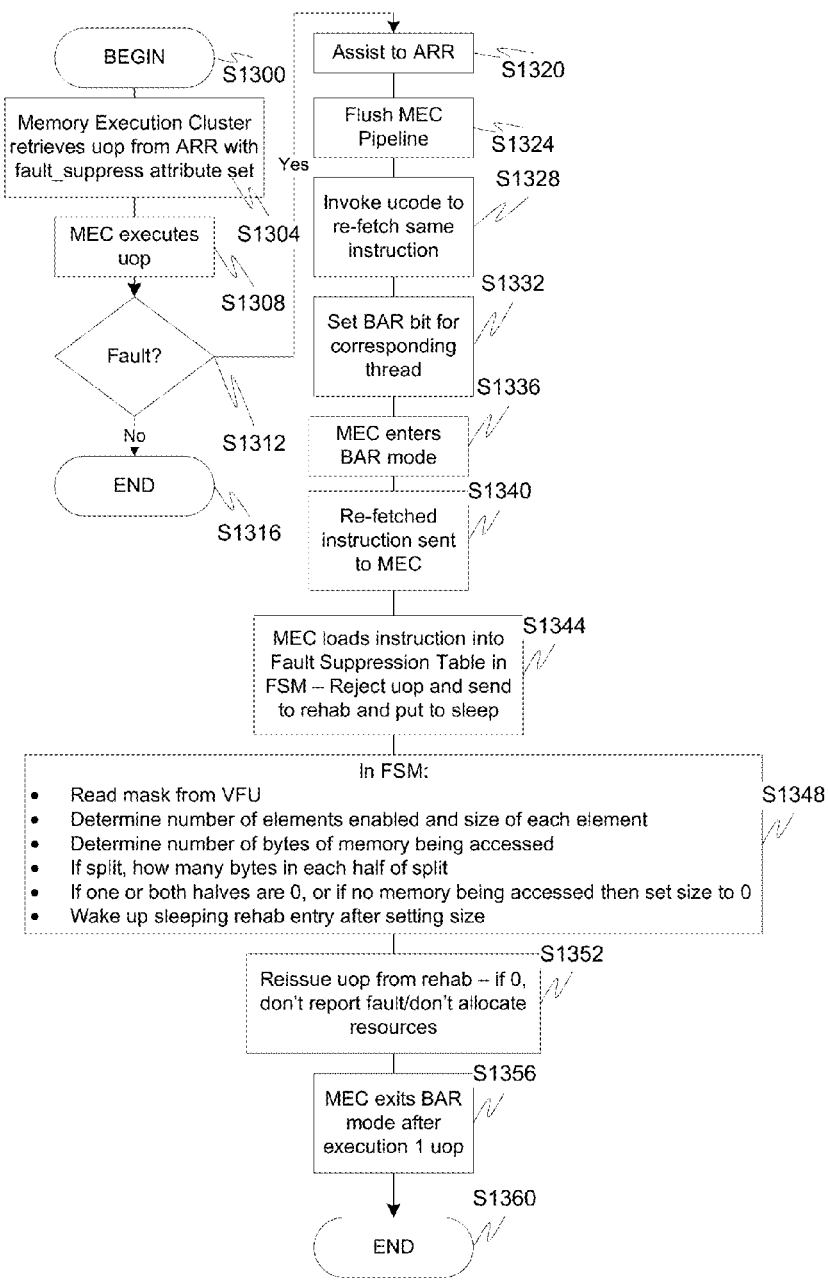
FIG. 13 is a flowchart illustrating an exemplary method of memory fault suppression

FIG. 13 outlines an exemplary method for fault suppression. In particular, control begins in step S1300 and continues to step S1304. In step S1304, a memory execution cluster retrieves an instruction from the allocation, re-name and retirement cluster where the fault-suppressed attribute has been set. Next, in step S1308, the MEC executes the instruction. Then, in step S1312, a determination is made as to whether there is a fault. If no fault occurred, control continues to step S1316 where the instruction can complete memory execution as normal.

However, if there is a fault, control continues to step S1320. In step S1320, an assist is sent to the allocation, re-name and retirement cluster. Next, in step S1324, the MEC pipeline is flushed. Then, in step S1328, a ucode is invoked to re-fetch the same instruction. Control then continues to step S1332.

In step S1332, the BAR bit for the corresponding thread is set and, in step S1336, the MEC enters the BAR mode. Then, in step S1340, the re-fetched instruction is set to the MEC. Control then continues to step S1344.

In step S1344, the MEC loads the re-fetched instruction into the fault suppression table in the finite state machine, and rejects the instruction and sends it to rehab and puts the instruction to sleep. Next, in step S1348, and in the FSM, the following tasks are performed: read mask from the VFU, determine number of elements enabled and size of each element, determine number of bytes of memory being accessed, if split, how many bytes in each half of the split, if one or both halves are zero, or if no memory is being accessed, then set size to zero, and wake up sleeping rehab entry after setting the size. Control then continues to step S1352.

In step S1352, the instruction is reissued from rehab. If zero, a fault is not reported, and resources are not allocated. Next, in step S1356, the MEC exits the BAR mode after execution of the one instruction. Control then continues to step S1360 where the control sequence ends.

Figure 14:
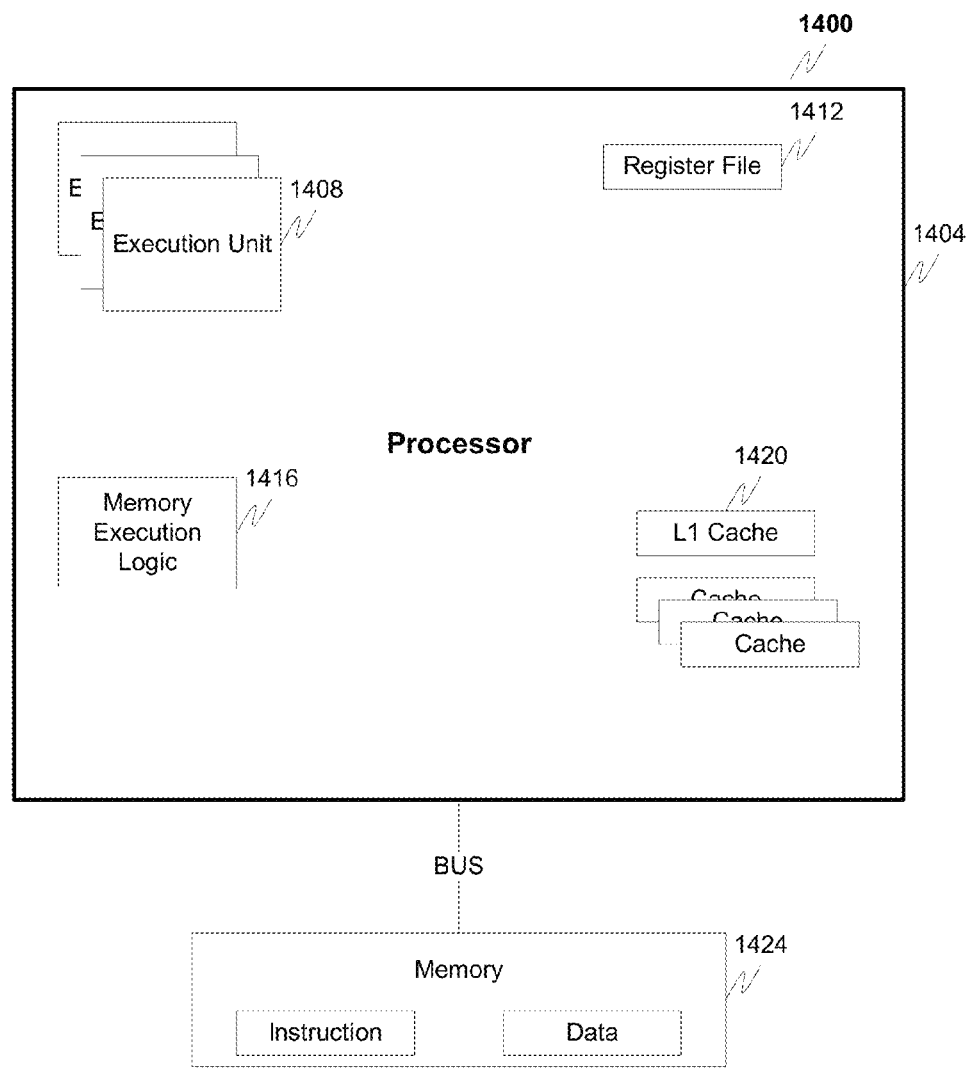
FIG. 14 illustrates an exemplary processor architecture.

FIG. 14 illustrates an exemplary computing system 1400 that is capable of implementing memory fault suppression in accordance with some embodiments. The computing system 1400 includes a processor 1404 that includes one or more execution units 1408 to execute an instruction (e.g., store or load instruction) in accordance with one or more embodiments as described herein. Computing system 1400 further includes a component, such as a processor 1404, to employ execution units 1408 including logic to perform algorithms for processing data in accordance with the embodiments described herein. System 1400 is representative of an exemplary processing system from Intel Corporation of Santa Clara, Calif., although other systems (including PCs having other microprocessors, engineering workstations, set-top boxes, and the like) may also be used.

In one embodiment, the exemplary computing system 1400 executes a version of the WINDOWS™ operating system available from Microsoft Corporation of Redmond, Wash., although other operating systems (e.g., UNIX and Linux), embedded software, and/or graphical user interfaces may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Examples of handheld devices include, but are not limited to, cellular phones, Internet Protocol devices, digital cameras, personal digital assistants (PDAs), and handheld PCs. Embedded applications may include, but are not limited to, a micro controller, a digital signal processor (DSP), system on a chip (SoC), network computers (NetPC), set-top boxes, network hubs, wide area network (WAN) switches, or any other system that can perform one or more instructions in accordance with at least one embodiment.

In the exemplary embodiment of FIG. 14, processor 1404 includes one or more execution units 1408 to implement an algorithm that is to perform at least one instruction. One embodiment may be described in the context of a single processor desktop or server system, but alternative embodiments may be included in a multiprocessor system. System 1400 may be an example of a 'hub' system architecture. The computer system 1400 includes a processor 1404 to process data signals. The processor 1404, as one illustrative example, includes a complex instruction set computer (CISC) microprocessor, a reduced instruction set computing (RISC) microprocessor, a very long instruction word (VLIW) microprocessor, a processor implementing a combination of instruction sets, an out of order based processor, or any other processor device, such as a digital signal processor, for example. The processor 1404 is coupled to a processor bus (BUS) that transmits data signals between the processor 1404 and other components in the system 1400, such as main memory 1424 storing instruction, data, or any combination thereof. The other components of the system 1400 may include, but are not limited to, a graphics accelerator, a memory controller hub, an I/O controller hub, a wireless transceiver, a Flash BIOS, a network controller, an audio controller, a serial expansion port, and an I/O controller. These elements perform their conventional functions that are well known to those familiar with the art and are not illustrated herein.

In one embodiment, the processor 1404 includes a Level 1 (L1) internal cache memory 1420. Depending on the architecture, the processor 1404 may have a single internal cache memory or multiple levels of internal cache memories (e.g., L1 and L2) as shown. Other embodiments include a combination of both internal and external caches depending on the particular implementation and needs. Register file 1412 is capable of storing different types of data in various registers including, but not limited to, integer registers, floating point registers, vector registers, banked registers, shadow registers, checkpoint registers, status registers, configuration registers, and instruction pointer registers as illustrated in FIG. 1.

Execution unit(s) 1408, include logic to perform integer and floating point operations. The execution unit(s) may or may not have a floating point unit. The processor 1404, in one embodiment, includes a microcode (μcode) ROM to store microcode, which when executed, is capable of performing algorithms for certain macroinstructions or handle complex scenarios. Here, microcode is potentially updateable to handle logic bugs/fixes for processor 1404. Alternative embodiments of an execution unit 1408 may also be used in micro controllers, embedded processors, graphics devices, DSPs, and other types of logic circuits.

The system 1400 also includes a main memory 1424. Main memory 1424 may include, but is not limited to, a dynamic random access memory (DRAM) device, a static random access memory (SRAM) device, flash memory device, or other memory device. Main memory 1424 is capable of storing instructions and/or data represented by data signals that are to be executed by the processor 1404. The processor 1404 is coupled to the main memory 1424 via a processor bus. A system logic chip, such as a memory controller hub (MCH) may be coupled to the processor bus and main memory 1424. An MCH can provide a high bandwidth memory path to memory 1424 for instruction and data storage and for storage of graphics commands, data and textures. The MCH can be used to direct data signals between the processor 1404, main memory 1424, and other components in the system 1400 and to bridge the data signals between processor bus, main memory 1424, cache memory 1420, and system I/O, for example. The MCH may be coupled to main memory 1424 through a memory interface. In some embodiments, the system logic chip can provide a graphics port for coupling to a graphics controller through an Accelerated Graphics Port (AGP) or other graphics controller interconnect. The system 1400 may also include an I/O controller hub (ICH). The ICH can provide direct connections to some I/O devices via a local I/O bus. The local I/O bus is a high-speed I/O bus for connecting peripherals to the main memory 1424, chipset, and processor 1404. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

The memory execution logic 1416 is associated with the cache and is adapted to perform the various functions illustrated herein. As one example, the logic within FIGS. 3-12 can be included within the memory execution logic 1416 and/or the cache, such as L1 cache 1420.

In another embodiment of a system, the various logic illustrated herein may be used with a system on a chip. The memory for one such system may be a flash memory. The flash memory may be located on the same die as the processor and other system components. Additionally, other logic blocks, such as a memory controller or graphics controller, may also be located on a system on a chip.

Figure 15:
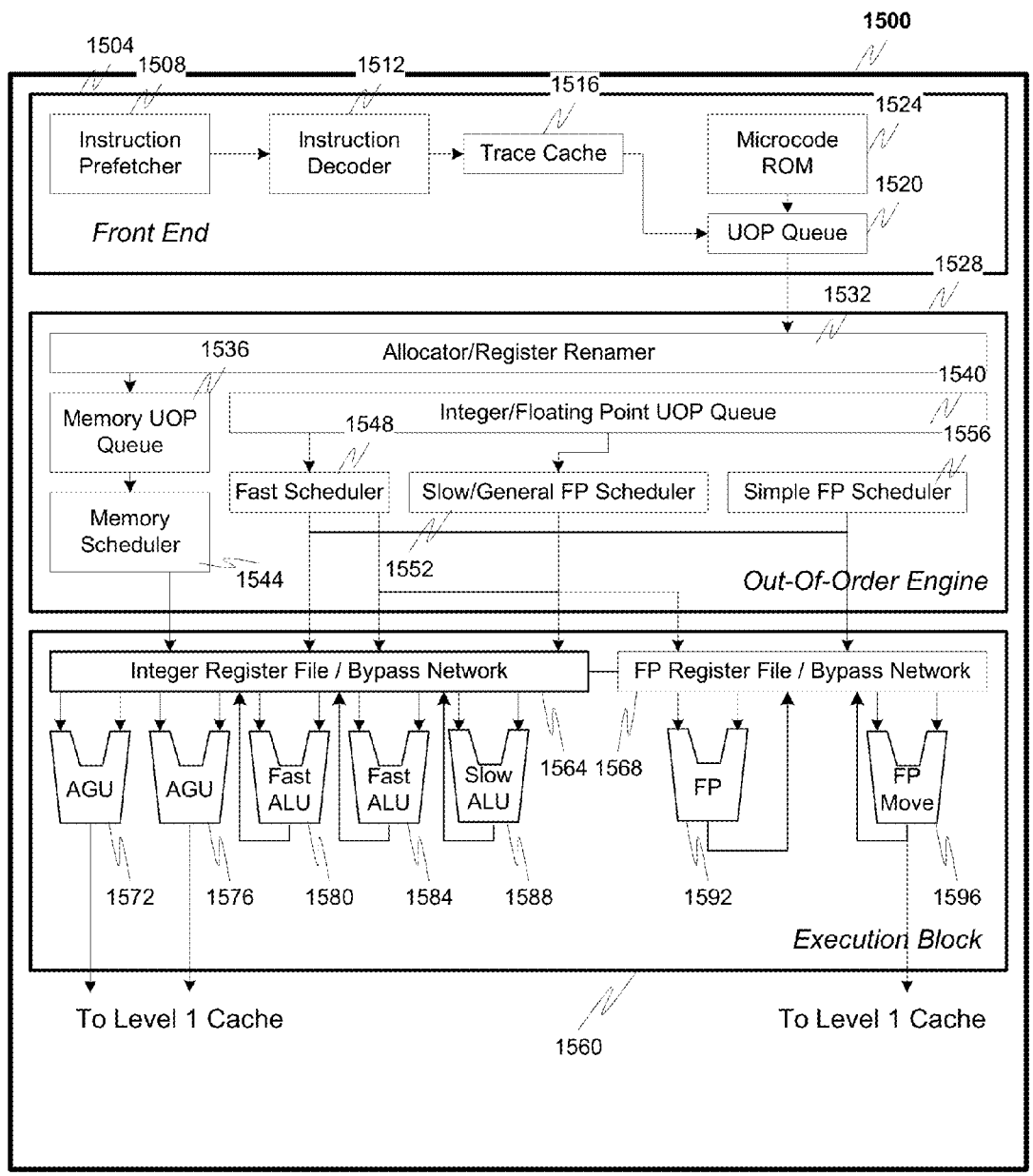
FIG. 15 illustrates another exemplary processor architecture.

FIG. 15 illustrates a block diagram of an exemplary micro-architecture for a processor 1500 that includes logic circuits to suppress faults according to one embodiment. The exemplary components discussed herein may be implemented in the processor 1500. In some embodiments, an instruction in accordance with one embodiment can be implemented to operate on data elements having sizes of byte, word, doubleword, quadword, etc., as well as data types, such as single and double precision integer and floating point data types. In one embodiment the in-order front end 1504 is the part of the processor 1500 that fetches instructions to be executed and prepares them to be used later in the processor pipeline.

The front end 1504 may include several units. In one embodiment, the instruction prefetcher 1508 fetches instructions from memory and feeds them to an instruction decoder 1512 which in turn decodes or interprets them. For example, in one embodiment, the decoder decodes a received instruction into one or more operations called "micro-instructions" or "micro-operations" (also called micro op or uops) that the machine can execute. In other embodiments, the decoder 1512 parses the instruction into an opcode and corresponding data and control fields that are used by the micro-architecture to perform operations in accordance with one embodiment. In one embodiment, the trace cache 1516 takes decoded uops and assembles them into program ordered sequences or traces in the uop queue 1520 for execution. When the trace cache 1516 encounters a complex instruction, the microcode ROM 1524 provides the uops needed to complete the operation.

Some instructions are converted into a single micro-op, whereas others need several micro-ops to complete the full operation. In one embodiment, if more than four micro-ops are needed to complete an instruction, the decoder 1512 accesses the microcode ROM 1524 to perform the instruction. For one embodiment, an instruction can be decoded into a small number of micro ops for processing at the instruction decoder 1512. In another embodiment, an instruction can be stored within the microcode ROM 1524 should a number of micro-ops be needed to accomplish the operation. The trace cache 1516 refers to an entry point programmable logic array (PLA) to determine a correct micro-instruction pointer for reading the micro-code sequences to complete one or more instructions in accordance with one embodiment from the micro-code ROM 1524. After the microcode ROM 1524 finishes sequencing micro-ops for an instruction, the front end 1504 of the processor resumes fetching micro-ops from the trace cache 1516.

The out-of-order execution engine 1528 is where instructions are prepared for execution. The out-of-order execution logic has a number of buffers to smooth out and re-order the flow of instructions to optimize performance as they travel down the pipeline and get scheduled for execution. The allocator logic 1532 allocates the machine buffers and resources that each uop needs in order to execute. The register renaming logic 1532 renames logic registers onto entries in a register file. The allocator 1532 also allocates an entry for each uop in one of the two uop queues, one for memory operations 1536 and one for non-memory operations 1540, in front of the instruction schedulers: memory scheduler 1544, fast scheduler 1548, slow/general floating point scheduler 1552, and simple floating point scheduler 1556. The uop schedulers 1548, 1552, 1556, determine when a uop is ready to execute based on the readiness of their dependent input register operand sources and the availability of the execution resources the uops need to complete their operation. The fast scheduler 1548 of one embodiment can schedule on each half of the main clock cycle while the other schedulers can only schedule once per main processor clock cycle. The schedulers arbitrate for the dispatch ports to schedule uops for execution. In some embodiments, the out-of-order execution engine 1528 and the execution block 1560 may notify a retirement unit with regard to the allocation and completion/execution of an instruction.

Register files 1564, 1568 sit between the schedulers 1548, 1552, 1556, and the execution units 1572, 1576, 1580, 1584, 1588, 1592 and 1596 in the execution block 1560. There are separate register files 1564, 1568, for integer and floating point operations, respectively. Each register file 1564, 1568, of one exemplary embodiment also includes a bypass network that can bypass or forward just completed results that have not yet been written into the register file to new dependent uops. The integer register file 1564 and the floating point register file 1568 are also capable of communicating data with the other. For one embodiment, the integer register file 1564 is split into two separate register files, one register file for the low order 32 bits of data and a second register file for the high order 32 bits of data. The floating point register file 1568 of one embodiment has 128 bit wide entries because floating point instructions typically have operands from 64 to 128 bits in width.

The execution block 1560 contains the execution units 1572, 1576, 1580, 1584, 1588, 1592 and 1596, where the instructions are actually executed. This section includes the register files 1564, 1568, that store the integer and floating point data operand values that the micro-instructions need to execute. The processor 1500 of one embodiment is comprised of a number of execution units: address generation unit (AGU) 1572, AGU 1576, fast ALU 1580, fast ALU 1584, slow ALU 1588, floating point ALU 1592, floating point move unit 1596. For one embodiment, the floating point execution blocks 1592, 1596, execute floating point, MMX, SIMD, and SSE, or other operations. The floating point ALU 1592 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 1580, 1584. The fast ALUs 1580, 1584, of one embodiment can execute fast operations with an effective latency of half a clock cycle. For one embodiment, most complex integer operations go to the slow ALU 1588 as the slow ALU 1588 includes integer execution hardware for long latency type of operations, such as a multiplier, shifts, flag logic, and branch processing. Memory load/store operations are executed by the AGUs 1572, 1576. For one embodiment, the integer ALUs 1580, 1584, 1588, are described in the context of performing integer operations on 64 bit data operands. In alternative embodiments, the ALUs 1580, 1584, 1588, can be implemented to support a variety of data bits including 16, 32, 128, 256, 512, etc. Similarly, the floating point units 1592, 1596, can be implemented to support a range of operands having bits of various widths. For one embodiment, the floating point units 1592, 1596, can operate on 128 bits wide packed data operands in conjunction with SIMD and multimedia instructions.

In one exemplary embodiment, the uops schedulers 1548, 1552, 1556, dispatch dependent operations before the parent load has finished executing. As uops are speculatively scheduled and executed in processor 1500, the processor 1500 also includes logic to handle memory misses. If a data load misses in the data cache, there can be dependent operations in flight in the pipeline that have left the scheduler with temporarily incorrect data. A replay mechanism can track and re-execute instructions that use incorrect data. Only the dependent operations need to be replayed and the independent ones are allowed to complete. The schedulers and replay mechanism of one embodiment of a processor are also designed to catch instruction sequences for text string comparison operations.

The processor 1500 also includes logic to manage the fault suppression and re-execution according to the description herein. For example, the processor can include a cache and/or logic to execute the potential fault detection and ucode assist techniques, the re-fetch and safe mode operations, the Fault Suppression Finite State Machine (FSM) (Fault Suppression Finite State Machine (FSFSM)) allocation, the suppress bits generation and the final re-execution.

The term "registers" may refer to the on-board processor storage locations that are used as part of instructions to identify operands. In other words, registers may be those that are usable from the outside of the processor (from a programmer's perspective). However, the registers, such as those illustrated in FIG. 1, of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 16:
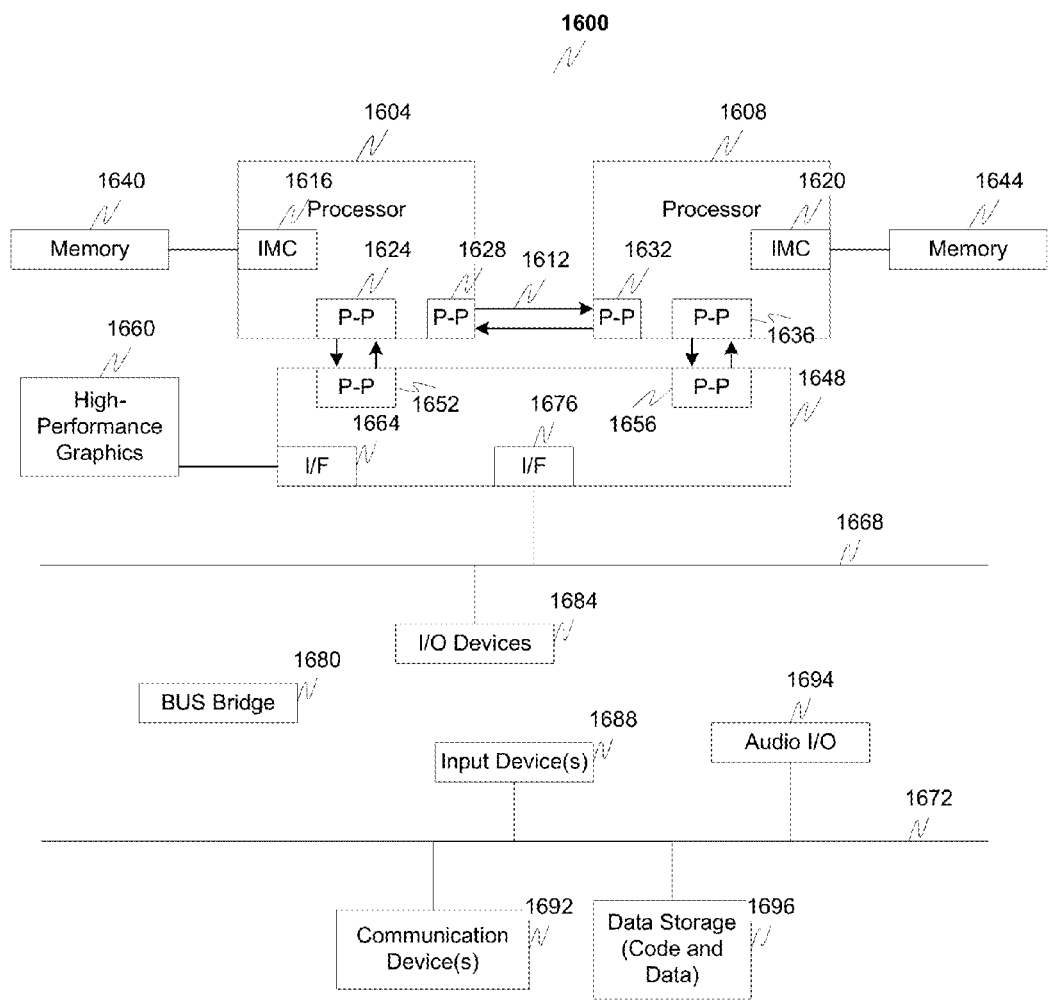
FIG. 16 illustrates another exemplary processor architecture.

Embodiments may be implemented in many different system types. Referring now to FIG. 16, a multiprocessor system 1600 is shown in accordance with an implementation. As shown in FIG. 16, multiprocessor system 1600 is a point-to-point interconnect system, and includes a first processor 1604 and a second processor 1608 coupled via a point-to-point interconnect 1612. As shown in FIG. 16, each of processors 1604 and 1608 may be multicore processors, including first and second processor cores, although potentially many more cores may be present in the processors. The processors each may include hybrid write mode logics in accordance with an embodiment of the present disclosure. In some embodiments, the various components illustrated herein may be implemented the multiprocessor system 1600. For example, memory execution cluster, ARR, FSFSM, etc., may be implemented in the processor 1604 and/or the processor 1608 and associated memory/cache.

While shown with two processors 1604, 1608, it is to be understood that the scope of the present disclosure is not so limited. In other implementations, one or more additional processors may be present in a given processor.

Processors 1604 and 1608 are shown including integrated memory controller units 1616 and 1620, respectively. Processor 1604 also includes as part of its bus controller units point-to-point (P-P) interfaces 1624 and 1628; similarly, the second processor 1608 includes P-P interfaces 1632 and 1636. Processors 1604, 1608 may exchange information via a point-to-point (P-P) interface 1612 using P-P interface circuits 1628, 1632. As shown in FIG. 16, IMCs 1616 and 1620 couple the processors to respective memories, namely a memory 1640 and a memory 1644, which may be portions of main memory locally attached to the respective processors.

Processors 1604, 1608 may each exchange information with a chipset 1648 via individual P-P interfaces 1652, 1656 using point to point interface circuits 1624, 1652, 1636, 1656. Chipset 1648 may also exchange information with a high-performance graphics circuit 1660 via a high-performance graphics interface 1664.

A shared cache (not shown) may optionally be included in either processor or outside of both processors, yet connected with the processors via, for example, the P-P interconnect, such that either or both processors' local cache information may be stored in the shared cache if a processor is placed into, for example, a low power mode.

Chipset 1648 may be coupled to a first bus 1668 via an interface 1676. In one embodiment, first bus 1668 may be a Peripheral Component Interconnect (PCI) bus, or a bus such as a PCI Express bus or another third generation or later I/O interconnect bus, although the scope of the present disclosure is not so limited.

As shown in FIG. 16, various I/O devices 1684 may be coupled to the first bus 1668, along with a bus bridge 1680 which couples first bus 1668 to a second bus 1672. In one embodiment, the second bus 1672 may be a low pin count (LPC) bus. Various devices may be coupled to second bus 1672 including, for example, a keyboard and/or mouse or other input device 1688, communication devices 1692 and a storage unit 1696 such as a disk drive or other mass storage device which may include instructions/code and data, in one embodiment. Further, an audio I/O 1694 may be coupled to second bus 1672. Note that other architectures are possible. For example, instead of the point-to-point architecture of FIG. 16, a system may implement a multi-drop bus or other such architecture.

Figure 17:
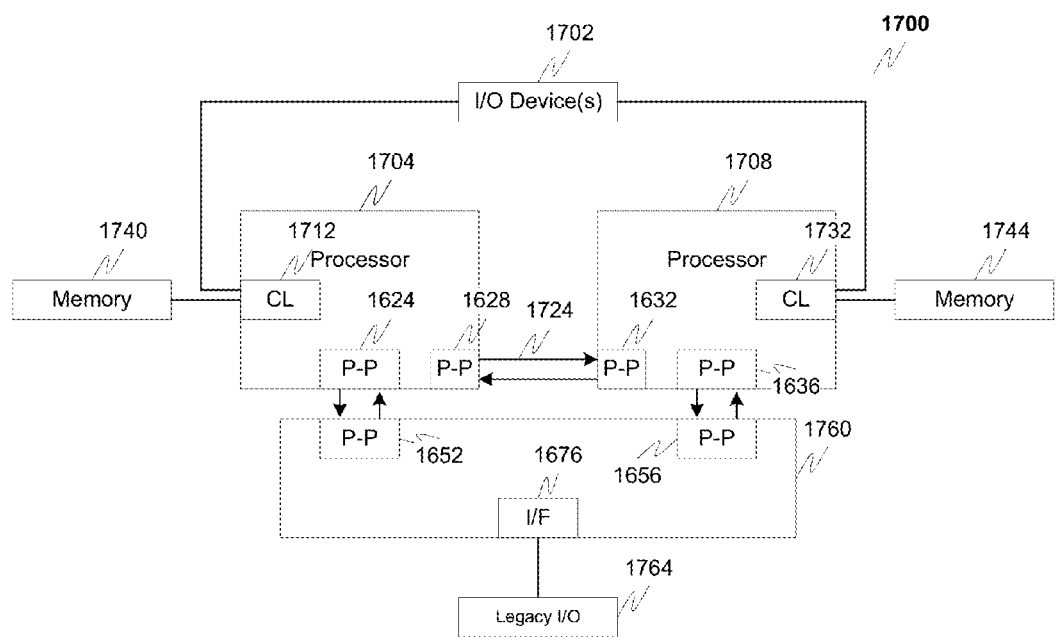
FIG. 17 illustrates another exemplary processor architecture.

Referring now to FIG. 17, illustrated is a diagram of a third system 1700 in accordance with an embodiment of the present disclosure. Like elements in FIGS. 15 and 16 bear like reference numerals, and certain aspects of FIG. 16 have been omitted from FIG. 17 in order to avoid obscuring other aspects of FIG. 17.

FIG. 17 illustrates that the processors 1704, 1708 may include integrated memory and I/O control logic ("CL") 1712 and 1732, respectively. For at least one embodiment, the CL 1712, 1732 may include integrated memory controller units such as described herein. In addition. CL 1712, 1732 may also include I/O control logic. FIG. 17 illustrates that the memories 1740, 1744 are coupled to the CL 1712, 1732, and that I/O devices 1702 are also coupled to the control logic 1712, 1732. Legacy I/O devices 1764 are coupled to the chipset 1760.

In some embodiments, the memory execution cluster, ARR, FSFSM, and other elements described herein may be implemented in the processor 1704 and/or the processor 1708 and associated memory/cache.

Figure 18:
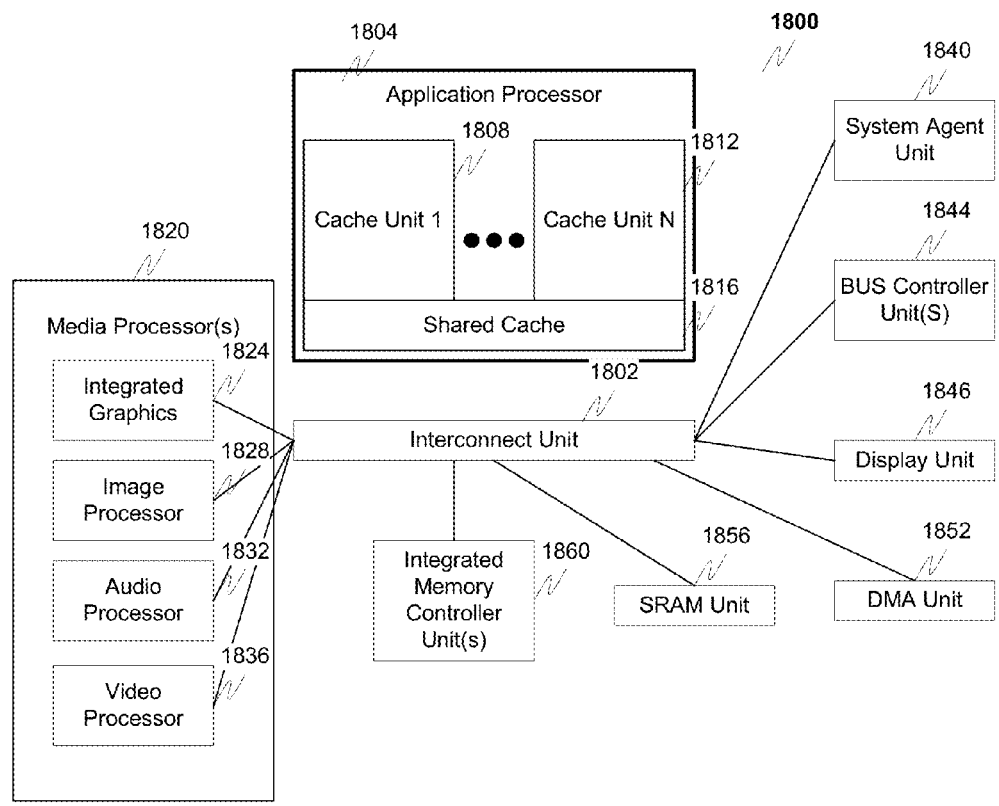
FIG. 18 illustrates another exemplary processor architecture.

FIG. 18 is an exemplary System on a Chip (SoC) 1800 that may include one or more cores 1808-1812. Other system designs and configurations known in the art for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a large number of systems or electronic devices capable of incorporating a processor and/or other execution logic as disclosed herein are generally suitable.

Referring now to FIG. 18, shown is a diagram of a SoC 1800 in accordance with an embodiment of the present disclosure. In FIG. 10, an interconnect unit(s) 1802 is coupled to: an application processor 1804 which includes a set of one or more cores 1808-1812 and shared cache unit(s) 1816; a system agent unit 1840; a bus controller unit(s) 1844; an integrated memory controller unit(s) 1860; a set or one or more media processors 1820 which may include integrated graphics logic 1824, an image processor 1828 for providing still and/or video camera functionality, an audio processor 1832 for providing hardware audio acceleration, and a video processor 1836 for providing video encode/decode acceleration; a static random access memory (SRAM) unit 1030; a direct memory access (DMA) unit 1032; and a display unit 1846 for coupling to one or more external displays.

In some embodiments the memory execution cluster, ARR, FSFSM, and other components/logic described herein may be implemented in the processor 1804 and the associated memory/cache.

Figure 19:
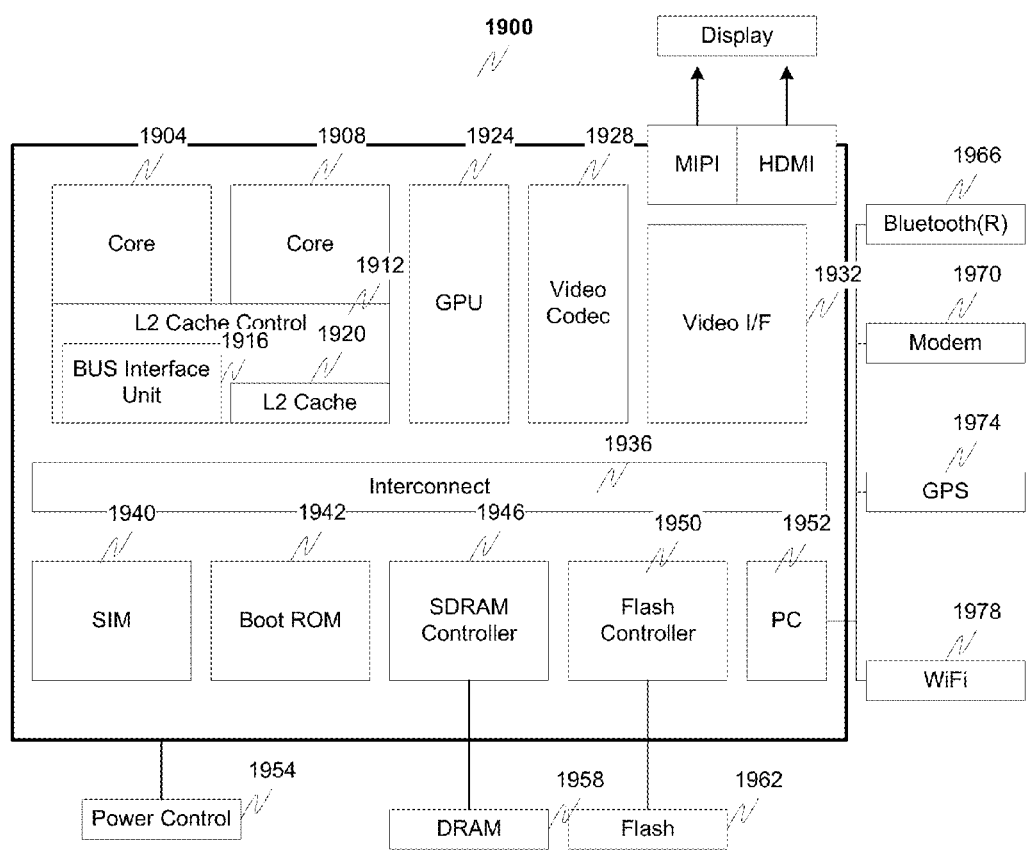
FIG. 19 illustrates another exemplary processor architecture.

FIG. 19 illustrates an embodiment of a system on-chip (SOC) design 1900 in accordance with embodiments of the disclosure. As an illustrative example, SOC 1900 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a network.

In some embodiments, for example, memory execution cluster, ARR, FSFSM, and other componentry described herein may be implemented in the cores and associated memory/cache.

Here, SOC 1900 includes two cores—1904 and 1908. Similar to the discussion above, cores 1904 and 1908 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1904 and 1908 are coupled to cache control 912 that is associated with bus interface unit 1916 and L2 cache 1920 to communicate with other parts of system 1900. Interconnect 1936 includes an on-chip interconnect, such as an IOSF, AMBA, or other interconnects discussed above, which can implement one or more aspects of the described disclosure.

Interconnect 1936 provides communication channels to the other components, such as a Subscriber Identity Module (SIM) 1940 to interface with a SIM card, a boot ROM 1942 to hold boot code for execution by cores 1904 and 1908 to initialize and boot SOC 1900, a SDRAM controller 1946 to interface with external memory (e.g. DRAM 1958), a flash controller 1950 to interface with non-volatile memory (e.g., flash 1962), a peripheral control 1952 (e.g., Serial Peripheral Interface) to interface with peripherals, video codecs 1928 and Video interface 1932 to display and receive input (e.g., touch enabled input), GPU 1924 to perform graphics related computations, etc. Any of these interfaces may incorporate aspects of the embodiments described herein.

In addition, the system illustrates peripherals for communication, such as a Bluetooth module 1966, modem 1970, GPS 1974, and WiFi 1978. Note as stated above, a UE can include a radio for communication. As a result, these peripheral communication modules may not all be included. However, in a UE some form of a radio for external communication is generally included.

Figure 20:
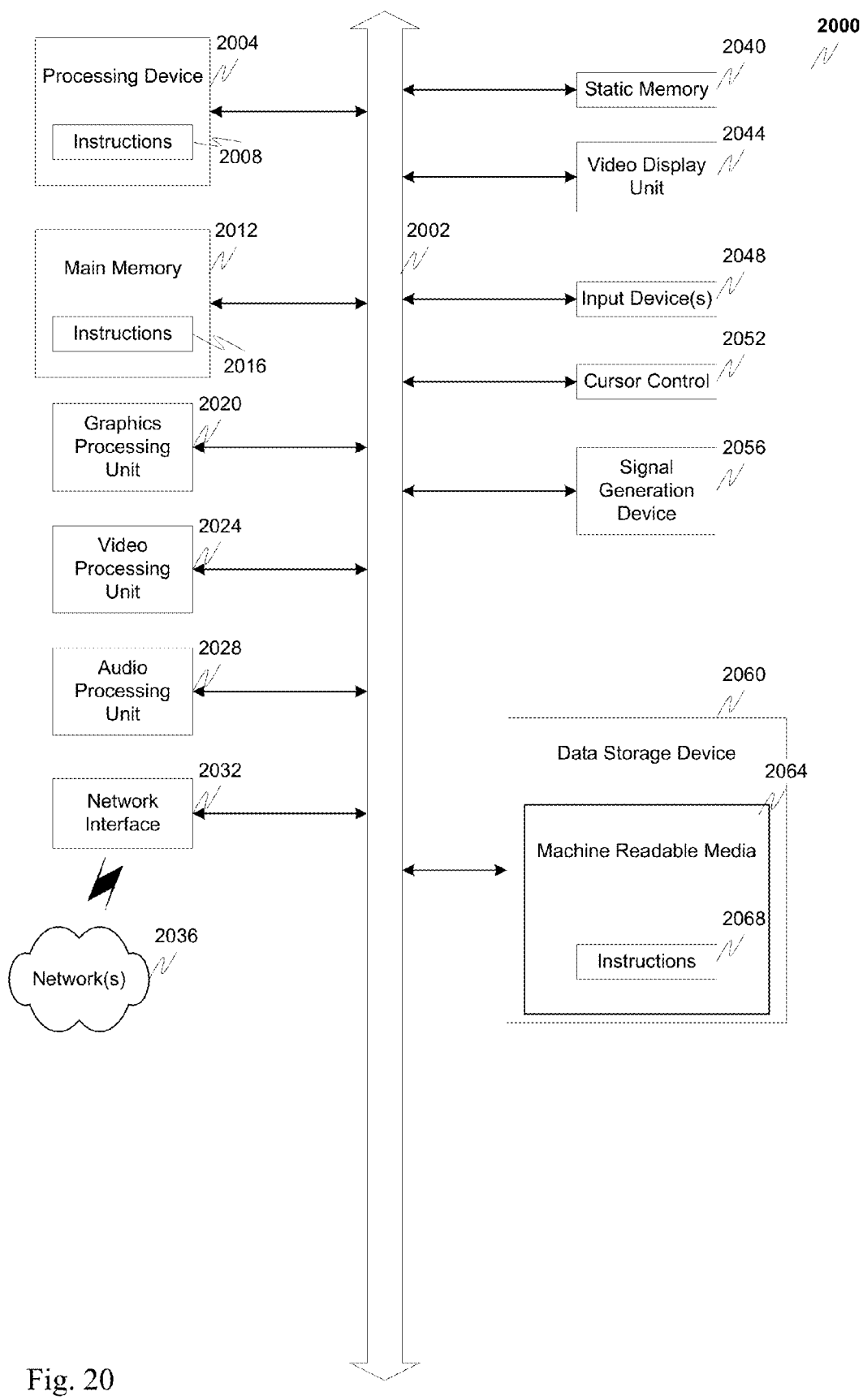
FIG. 20 illustrates another exemplary processor architecture.

FIG. 20 illustrates a representation of a machine in the example form of a computing system 2000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 2000 includes a processing device 2004, main memory 2012 (e.g., read-only memory (ROM), flash memory, dynamic random access memory (DRAM) (such as synchronous DRAM (SDRAM) or DRAM (RDRAM), etc.), a static memory 2040 (e.g., flash memory, static random access memory (SRAM), etc.), and a data storage device 2060, which communicate with each other via a bus 2002.

In some embodiments, the memory execution cluster, ARR, FSFSM, and other elements/logic described herein may be implemented in the processor and associated memory/cache.

Processing device 2004 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 2004 may also be one or more special-purpose processing devices such as an application specific integrated circuit (ASIC), a field programmable gate array (FPGA), a digital signal processor (DSP), network processor, or the like. In one embodiment, processing device 2004 may include one or processing cores. The processing device 2004 is configured to execute the processing logic 2016 for performing the operations discussed herein. In one embodiment, processing device 2004 can be part of the computing system. Alternatively, the computing system 2000 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 2000 may further include a network interface device 2032 communicably coupled to a network 2036. The computing system 2000 also may include a video display unit 2024 (e.g., a liquid crystal display (LCD) or other display), an input device 2048 (e.g., a keyboard), a cursor control device 2052 (e.g., a mouse), a signal generation device 2056 (e.g., a speaker), or other peripheral devices. Furthermore, computing system 2000 may include a graphics processing unit 2020, a video processing unit 2024 and an audio processing unit 2028. In another embodiment, the computing system 2000 may include a chipset (not illustrated), which refers to a group of integrated circuits, or chips, that are designed to work with the processing device 2004 and controls communications between the processing device 2004 and external devices. For example, the chipset may be a set of chips on a motherboard that links the processing device 2004 to very high-speed devices, such as main memory 2012 and graphic controllers, as well as linking the processing device 12004 to lower-speed peripheral buses of peripherals, such as USB, PCI or ISA buses.

The data storage device 2060 may include a computer-readable storage medium 2064 on which is stored software 2068 embodying any one or more of the methodologies or functions described herein. The software 2068 may also reside, completely or at least partially, within the main memory 2012 as instructions 2016 and/or within the processing device 2004 as processing logic 2008 during execution thereof by the computing system 2000. The main memory 2012 and the processing device 2004 could also include computer-readable storage media.

The computer-readable storage medium 2064 may also be used to store instructions 2068 utilizing the processing device 2004, such as described herein and/or a software library containing methods that call the above applications. While the computer-readable storage media 2064 is shown in an exemplary embodiment to be a single medium, the term "computer-readable storage media" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Aspects of the disclosure are directed toward:

A processor comprising:

logic adapted to retrieve an instruction from an allocation, rename and retirement cluster, the instruction having a fault suppress attribute set; and logic adapted to execute the instruction and determine if there is a fault, and when a fault occurs, issues an assist to the allocation, rename and retirement cluster.

Any of the above aspects, wherein the allocation, rename and retirement cluster further re-fetches the same instruction.

Any of the above aspects, wherein the memory execution cluster receives the re-fetched the instruction.

Any of the above aspects, wherein a block at retirement bit is changed and the system enters a block at retirement mode.

Any of the above aspects, further comprising a memory execution cluster adapted to receive the instruction again with the instruction being forwarded to a fault suppression finite state machine.

Any of the above aspects, wherein the instruction is sent to rehab and put to sleep.

Any of the above aspects, wherein the fault suppression finite state machine performs the following: reads a mask from a vector and floating point execution unit, determines a number of elements enabled and size of each element, determines a number of bytes of memory being accessed, and if split, how many bytes in each half of the split, and if one or both halves are zero, or if no memory is being accessed, then a size is set to zero, and the sleeping rehab entry is woken up after setting the size.

Any of the above aspects, wherein rehab reissues instruction and if zero, a fault is not declared.

Any of the above aspects, wherein the system is in a memory subsystem.

Any of the above aspects, further comprising a fault suppression finite state machine with the following states: idle, mask read, compute suppress bits and write suppress bits/rehab wake-up.

A fault suppression method comprising:

retrieving an instruction from an allocation, rename and retirement cluster, the instruction having a fault suppress attribute set; and executing the instruction and determining if there is a fault, and when a fault occurs issues an assist to the allocation, rename and retirement cluster.

Any of the above aspects, further comprising re-fetching the same instruction.

Any of the above aspects, further comprising a memory execution cluster receiving the re-fetched the instruction.

Any of the above aspects, further comprising changing a block at retirement bit and entering a block at retirement mode.

Any of the above aspects, further comprising receiving the instruction again with the instruction being forwarded to a fault suppression finite state machine.

Any of the above aspects, wherein the instruction is sent to rehab and put to sleep.

Any of the above aspects, wherein the fault suppression finite state machine performs the following: reads a mask from a vector and floating point execution unit, determines a number of elements enabled and size of each element, determines a number of bytes of memory being accessed, and if split, how many bytes in each half of the split, and if one or both halves are zero, or if no memory is being accessed, then a size is set to zero, and the sleeping rehab entry is woken up after setting the size.

Any of the above aspects, wherein rehab reissues instruction and if zero, a fault is not declared.

Any of the above aspects, wherein the method is performed in a memory subsystem.

Any of the above aspects, further comprising switching between the following states in a fault suppression finite state machine: idle, mask read, compute suppress bits and write suppress bits/rehab wake-up.

A fault suppression processor system comprising:

means for retrieving an instruction from an allocation, rename and retirement cluster, the instruction having a fault suppress attribute set; and means for executing the instruction and determining if there is a fault, and when a fault occurs issues an assist to the allocation, rename and retirement cluster.

Any of the above aspects, further comprising means for re-fetching the same instruction.

Any of the above aspects, further comprising means for receiving the re-fetched the instruction.

Any of the above aspects, further comprising means for changing a block at retirement bit and entering a block at retirement mode.

Any of the above aspects, further comprising means for receiving the instruction again with the instruction being forwarded to a fault suppression finite state machine.

Any of the above aspects, wherein the instruction is sent to rehab and put to sleep.

Any of the above aspects, wherein the fault suppression finite state machine performs the following: reads a mask from a vector and floating point execution unit, determines a number of elements enabled and size of each element, determines a number of bytes of memory being accessed, and if split, how many bytes in each half of the split, and if one or both halves are zero, or if no memory is being accessed, then a size is set to zero, and the sleeping rehab entry is woken up after setting the size.

Any of the above aspects, wherein rehab reissues instruction and if zero, a fault is not declared.

Any of the above aspects, wherein the method is performed in a memory subsystem.

Any of the above aspects, further comprising means for switching between the following states in a fault suppression finite state machine: idle, mask read, compute suppress bits and write suppress bits/rehab wake-up.

A non-transitory computer readable information storage media having stored thereon instructions, that when executed by a processor, cause to be performed a method for fault suppression comprising:

retrieving an instruction from an allocation, rename and retirement cluster, the instruction having a fault suppress attribute set; and executing the instruction and determining if there is a fault, and when a fault occurs issues an assist to the allocation, rename and retirement cluster.

Any of the above aspects, further comprising re-fetching the same instruction.

Any of the above aspects, further comprising a memory execution cluster receiving the re-fetched the instruction.

Any of the above aspects, further comprising changing a block at retirement bit and entering a block at retirement mode.

Any of the above aspects, further comprising receiving the instruction again with the instruction being forwarded to a fault suppression finite state machine.

Any of the above aspects, wherein the instruction is sent to rehab and put to sleep.

Any of the above aspects, wherein the fault suppression finite state machine performs the following: reads a mask from a vector and floating point execution unit, determines a number of elements enabled and size of each element, determines a number of bytes of memory being accessed, and if split, how many bytes in each half of the split, and if one or both halves are zero, or if no memory is being accessed, then a size is set to zero, and the sleeping rehab entry is woken up after setting the size.

Any of the above aspects, wherein rehab reissues instruction and if zero, a fault is not declared.

Any of the above aspects, wherein the method is performed in a memory subsystem.

Any of the above aspects, further comprising switching between the following states in a fault suppression finite state machine: idle, mask read, compute suppress bits and write suppress bits/rehab wake-up.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a system and/or on the die.

The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exemplary techniques illustrated herein are not limited to the specifically illustrated embodiments but can also be utilized with the other exemplary embodiments and each described feature is individually and separately claimable.

Additionally, the systems, methods and techniques can be implemented on one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like. In general, any device capable of implementing a state machine that is in turn capable of implementing the methodology illustrated herein can be used to implement the various protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMDO FX™ family of processors, AMD®, FX-4300, FX-6300, and FX-8350 32 nm Vishera, AMD®, Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIVI926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized.

Moreover, the disclosed methods may be readily implemented in software and/or firmware that can be stored on a storage medium, executed on programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated system or system component, or the like. The system can also be implemented by physically incorporating the system and/or method into a software and/or hardware system, such as the hardware and software systems of a processor.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures arrows are used to show connections and couplings.

The term "and/or" may have been used. As used herein, the term "and/or" means one or the other or both (e.g., A and/or B means A or B or both A and B).

In the description herein, specific details have been set forth in order to provide a thorough understanding of the embodiments. However, other embodiments may be practiced without some of these specific details. The scope of the embodiments is not to be determined by the specific examples provided above, but only by the claims below. In other instances, well-known circuits, structures, devices, and operations have been shown in block diagram form and/or without detail and/or omitted in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or otherwise clearly apparent.

Certain operations may be performed by hardware components, or may be embodied in machine-executable or circuit-executable instructions, that may be used to cause and/or result in a machine, circuit, or hardware component (e.g., a processor(s), core(s), portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may store or otherwise provide one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like.

Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit. Examples of such computing devices and electronic devices include, but are not limited to, desktop computers, laptop computers, notebook computers, tablet computers, netbooks, smartphones, cellular phones, servers, network devices (e.g., routers), Mobile Internet devices (MIDs), media players, smart televisions, nettops, miniature PC, set-top boxes, and video game controllers.

Reference throughout this specification to "one embodiment," "an embodiment," "one or more embodiments," "some embodiments," for example, indicates that a particular feature may be included in the practice of the technique but is not necessarily required to be. Similarly, in the description, various features are sometimes grouped together in a single embodiment, Figure, or description thereof for the purpose of streamlining the disclosure and aiding in the understanding of various inventive aspects. This method of disclosure, however, is not to be interpreted as reflecting an intention that the techniques herein require more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment.

Although embodiments described herein are describe in relation to processors, such as multicore processors including multiple cores, system agent circuitry, cache memories, and one or more other processing units, understand the scope of the present disclosure is not limited in this regard and embodiments are applicable to other semiconductor devices such as chipsets, graphics chips, memories and so forth. Also, although embodiments described herein are with regard to hardware prefetching, in accordance with an embodiment the system can be used to access data in other devices as well.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the disclosed techniques may be described with respect to a limited number of embodiments, those skilled in the art will appreciate numerous modifications and variations therefrom. It is intended that the appended claims cover all such modifications and variations that fall within the spirit and scope of the present disclosure.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of processors" may include two or more processors.

The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

It is therefore apparent that there has been provided systems and methods for memory fault suppression. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A device comprising:
a processor;
an execution unit within the processor; and
memory within the processor, the processor including:
logic adapted to retrieve an instruction from an allocation, rename and retirement cluster, the instruction having a fault suppress attribute set, the fault suppress attribute based on a masked value available at a memory operation execution time; and
logic adapted to execute the instruction and determine if there is a fault, and when a fault occurs, issue an assist to the allocation, rename and retirement cluster,
wherein a memory execution cluster adapted to receive the instruction again with the instruction being forwarded to a fault suppression finite state machine, and wherein the fault suppression finite state machine performs the following: reads a mask from a vector and floating point execution unit, determines a number of elements enabled and size of each element, determines a number of bytes of memory being accessed, and if split, how many bytes in each half of the split, and if one or both halves of the split are zero, or if no memory is being accessed, then a size is set to zero, and the sleeping rehab entry is woken up after setting the size.

2. The device of claim 1, wherein the allocation, rename and retirement cluster further re-fetches the same instruction.

3. The device of claim 2, wherein a memory execution cluster receives the re-fetched the instruction.

4. The device of claim 3, wherein a block at retirement bit is changed and the processor enters a block at retirement mode.

5. The device of claim 1, wherein the instruction is sent to rehab and put to sleep.

6. The device of claim 1, wherein rehab reissues the instruction and if zero, a fault is not declared.

7. The device of claim 1, further comprising a memory subsystem.

8. The device of claim 1, further comprising a fault suppression finite state machine with the following states: idle, mask read, compute suppress bits and write suppress bits/rehab wake-up.

9. A fault suppression method comprising:
retrieving an instruction from an allocation, rename and retirement cluster, the instruction having a fault suppress attribute set, the fault suppress attribute based on a masked value available at a memory operation execution time; and
executing the instruction and determining if there is a fault, and when a fault occurs issuing an assist to the allocation, rename and retirement cluster,
wherein receiving the instruction again with the instruction being forwarded to a fault suppression finite state machine, and wherein the fault suppression finite state machine performs the following: reads a mask from a vector and floating point execution unit, determines a number of elements enabled and size of each element, determines a number of bytes of memory being accessed, and if split, how many bytes in each half of the split, and if one or both halves of the split are zero, or if no memory is being accessed, then a size is set to zero, and the sleeping rehab entry is woken up after setting the size.

10. The method of claim 9, further comprising re-fetching the same instruction.

11. The method of claim 10, further comprising a memory execution cluster receiving the re-fetched the instruction.

12. The method of claim 11, further comprising changing a block at retirement bit and entering a block at retirement mode.

13. The method of claim 9, wherein the instruction is sent to rehab and put to sleep.

14. The method of claim 9, wherein rehab reissues the instruction and if zero, a fault is not declared.

15. The method of claim 9, wherein the method is performed in a memory subsystem.

16. The method of claim 9, further comprising switching between the following states in a fault suppression finite state machine: idle, mask read, compute suppress bits and write suppress bits/rehab wake-up.

* * * * *

UNITED STATES PATENT AND TRADEMARK OFFICE
CERTIFICATE OF CORRECTION

PATENT NO. : 9,715,432 B2
APPLICATION NO. : 14/581859
DATED : July 25, 2017
INVENTOR(S) : Ramon Matas et al.

Page 1 of 1

It is certified that error appears in the above-identified patent and that said Letters Patent is hereby corrected as shown below:

In the Specification

- At Column 20, Line 7, delete "ARIVI926EJ-S™" insert -- ARM926EJ-S™ --, therefore.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*